United States Patent
Aoyama et al.

(10) Patent No.: US 11,971,906 B2
(45) Date of Patent: Apr. 30, 2024

(54) CLUSTERING APPARATUS, CLUSTERING METHOD, PROGRAM AND DATA STRUCTURE

(71) Applicant: NIPPON TELEGRAPH AND TELEPHONE CORPORATION, Tokyo (JP)

(72) Inventors: Kazuo Aoyama, Tokyo (JP); Takashi Hattori, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 449 days.

(21) Appl. No.: 17/057,487

(22) PCT Filed: Apr. 24, 2019

(86) PCT No.: PCT/JP2019/017454
§ 371 (c)(1),
(2) Date: Nov. 20, 2020

(87) PCT Pub. No.: WO2019/225274
PCT Pub. Date: Nov. 28, 2019

(65) Prior Publication Data
US 2021/0294819 A1   Sep. 23, 2021

(30) Foreign Application Priority Data

May 25, 2018 (JP) ................... 2018-100870

(51) Int. Cl.
*G06F 16/28* (2019.01)
*G06F 16/35* (2019.01)

(52) U.S. Cl.
CPC ............ *G06F 16/285* (2019.01); *G06F 16/35* (2019.01)

(58) Field of Classification Search
CPC ...... G06F 16/285; G06F 16/35; G06K 9/6223
See application file for complete search history.

(56) References Cited

U.S. PATENT DOCUMENTS

| 11,205,122 B1 * | 12/2021 | Arel ...................... G06F 16/285 |
| 2011/0158535 A1 * | 6/2011 | Iio ........................... G06V 10/50 |
| | | 382/190 |

(Continued)

FOREIGN PATENT DOCUMENTS

JP  2015138462 A  *  7/2015

OTHER PUBLICATIONS

"Refining Spherical K-Means for Clustering Documents," The 2006 IEEE International Joint Conference on Neural Network Proceedings, 2006, pp. 4146-4150, doi: 10.1109/IJCNN.2006.246962 (Year: 2006).*

(Continued)

*Primary Examiner* — Son T Hoang

(57) ABSTRACT

A clustering device includes a storage means configured to store a transposed file including array elements in a storage unit, the array elements storing a pair in which a cluster identifier and a first non-zero feature quantity of a mean feature vector are associated with each feature identifier, a calculation means configured to calculate a distance between the object feature vector in sparse representation indicating the object feature vector in a pair in which a second non-zero feature quantity of the object feature vector and a feature identifier of the second non-zero feature quantity are associated with each other, and the mean feature vector of each cluster, and an assignment means configured to assign the object feature vector to one of the plurality of clusters on the basis of the distance, and the calculation means calculates a product of a second non-zero feature quantity and a first non-zero feature quantity stored in an array element of an index based on a feature identifier corresponding to the (Continued)

second non-zero feature quantity among array elements constituting the transposed file, to calculate an inner product necessary for the calculation of the distance.

20 Claims, 17 Drawing Sheets

(56) References Cited

U.S. PATENT DOCUMENTS

| | | | |
|---|---|---|---|
| 2016/0004764 A1* | 1/2016 | Chakerian | G06F 16/285 707/737 |
| 2017/0316338 A1* | 11/2017 | Eshghi | G06F 16/285 |
| 2018/0097763 A1* | 4/2018 | Garcia | G06F 16/29 |
| 2018/0102938 A1* | 4/2018 | Yoon | G06F 11/323 |

OTHER PUBLICATIONS

Inderjit S. Dhillon and Dharmendra S. Modha, Concept Decompositions for large sparse text data using clustering, Machine Learning, 42, pp. 143-175, 2001 (Year: 2001).*

Stuart P. Lloyd (1982) "Least Squares Quantization in PCM," IEEE Transactions On Information Theory, vol. 28(2), pp. 129-137.

\* cited by examiner

CLUSTERING APPARATUS, CLUSTERING METHOD, PROGRAM AND DATA STRUCTURE

CROSS-REFERENCE TO RELATED APPLICATIONS

This application is a U.S. 371 Application of International Patent Application No. PCT/JP2019/017454, filed on 24 Apr. 2019, which application claims priority to and the benefit of JP Application No. 2018-100870, filed on 25 May 2018, the disclosures of which are hereby incorporated herein by reference in their entireties.

TECHNICAL FIELD

The present invention relates to a clustering device, a clustering method, a program, and a data structure.

BACKGROUND ART

A k-means method is known as a scheme for clustering a large amount of information (objects). The k-means method is, for example, a scheme for setting vector data representing features of an object (hereinafter referred to as an "object feature vector") to $x_i$ and dividing a data set X into K clusters when a data set $X=\{x_1, x_2, \ldots, x_n\}$ and the number K of clusters are given. In this k-means method, a cluster $C_j$ to which each $x_i$ belongs is determined so that a distance between a vector $\mu_j$ representing a mean of each $x_i$ belonging to the cluster $C_j$ (hereinafter referred to as a "mean feature vector") and the object feature vector $x_i$ are minimized.

Since a large amount of calculation is required to calculate an exact solution of the k-means method, a heuristic method called the Lloyd method is often used (NPL 1).

CITATION LIST

Non Patent Literature

[NPL 1] S. P. Lloyd, Least squares quantization in PCM, IEEE Trans. Inf. Theory, vol. 28, no. 2 (1982), pp. 129-137.

SUMMARY OF THE INVENTION

Technical Problem

Here, in the Lloyd method, in order to calculate a distance between each object feature vector $x_i$ and each mean feature vector $\mu_j$, it is necessary to calculate an inner product of these vectors. In this inner product calculation, a required memory capacity, a calculation time, and the like differ depending on a data structure in which the object feature vector $x_i$ and the mean feature vector $\mu_j$ are represented.

In a problem of clustering a large amount of objects as described above, the object feature vector is often sparse data, and as a result, clustering of large-scale sparse data is often performed. On the other hand, in the related art such as NPL 1 described above, when the Lloyd method is applied to clustering of sparse data, it is not possible to achieve efficiency of a memory capacity or a calculation time required for inner product calculation.

An embodiment of the present invention has been made in view of the above points and an object thereof is to efficiently cluster sparse data.

Means for Solving the Problem

In order to achieve the above object, an embodiment of the present invention provides a clustering device for clustering object feature vectors representing a feature of an object into a plurality of clusters, the clustering device including: a storage means configured to store a transposed file including array elements in a storage unit, the array elements storing a pair in which a cluster identifier for identifying the cluster and a first non-zero feature quantity of a mean feature vector representing a mean of object feature vectors belonging to the cluster are associated with each feature identifier for identifying the feature; a calculation means configured to calculate a distance between the object feature vector in sparse representation indicating the object feature vector in a pair in which a second non-zero feature quantity of the object feature vector and a feature identifier of the second non-zero feature quantity are associated with each other, and the mean feature vector of each cluster; and an assignment means configured to assign the object feature vector to one of the plurality of clusters on the basis of the distance calculated by the calculation means, wherein the calculation means calculates a product of the second non-zero feature quantity included in the object feature vector in sparse representation and a first non-zero feature quantity stored in an array element of an index based on a feature identifier corresponding to the second non-zero feature quantity among array elements constituting the transposed file, to calculate an inner product necessary for the calculation of the distance.

Effects of the Invention

According to the embodiment of the present invention, it is possible to efficiently cluster sparse data.

DESCRIPTION OF EMBODIMENTS

Figure 1:
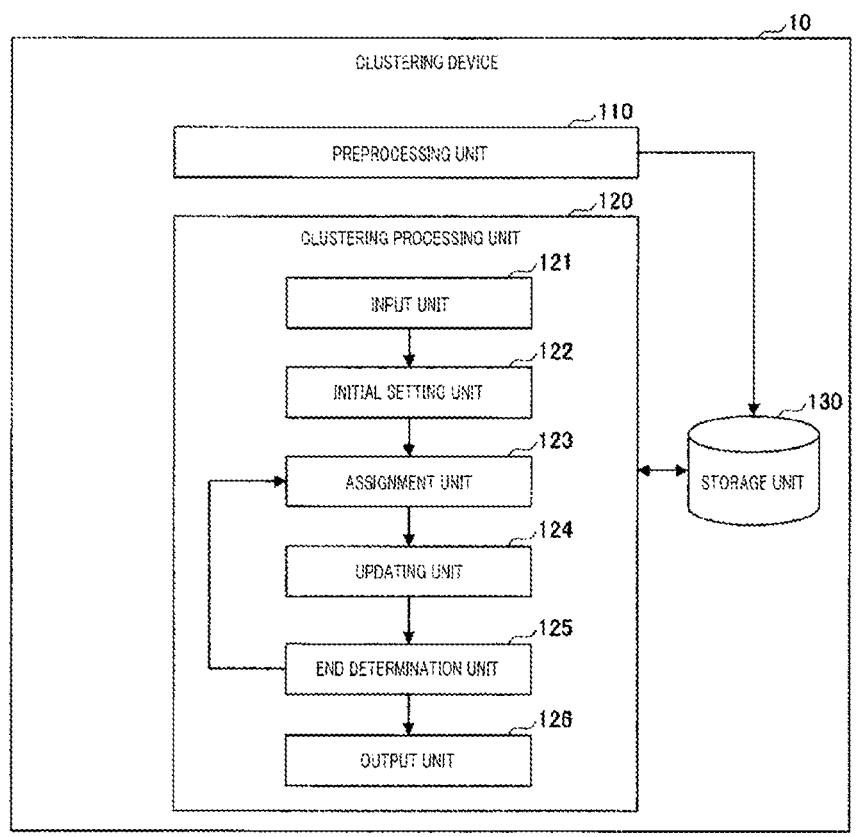
FIG. 1 is a diagram illustrating an example of a functional configuration of a clustering device according to an embodiment of the present invention.

Hereinafter, embodiments of the present invention will be described in detail with reference to the drawings. A clustering device 10 capable of efficiently clustering sparse data will be described in the embodiment of the present invention.

<Preparation>

First, data that is a clustering target and a Lloyd method will be described in preparation for an embodiment of the present invention.

(1) Data that is Clustering Target

In the embodiment of the present invention, large-scale sparse data is a clustering target. An example of such data includes an object feature vector representing features of documents when documents are set as objects and a large number of documents are clustered.

When an object is a document, the object is often treated as a point in a Euclidean space that is a feature space using a bag-of-words model (hereinafter referred to as "BoW"). The document is also called text, a document, or the like, but these are collectively referred to as a "document".

In the BoW, the document is divided into a set of character strings represented by words appearing in the document, and each word is one of features of the document. Certain quantities corresponding to the features are set as feature quantities, and the document is represented by a vector having these feature quantities as elements. The words are also referred to as a vocabulary or terms, but hereinafter, the words, the vocabulary, and the terms are collectively referred to as "words".

Here, the feature quantity is represented as a value of a function of which input variables are a frequency (term frequency) at which a certain word appears in a document and a frequency (document frequency) at which the word appears in each document of an object set (a document set). The function is often, for example, tf-idf (term-frequency-inverse document frequency), and a general function is as follows.

$tf(t_h, x_i; X)$: A frequency of $t_h$ appearing in $x_i$ when $X$ is given, $df(t_h, X)$: The number $n_h$ of documents (objects) including $t_h$ when $X$ is given, $$idf(t_h; X) = \log(n/n_h),$$

$$tf\text{-}idf(t_h, x_i; X) = tf(t_h, x_i; X) \times idf(t_h; X)$$

Here, X is an object feature vector set $X = \{x_1, x_2, \ldots, x_n\}$ corresponding to an object set (a document set), and $x_i$ (i=1, 2, ..., n) is an object feature vector. Further, the number of objects $|X|$ is $|X|=n$, and $n_h$ is the number of documents including a word $t_h$. A base of log of a function representing idf is not limited.

In this case, the number of dimensions of the feature space is the number of different words in all documents included in the document set, and is very large. That is, the feature space becomes a high-dimensional space.

On the other hand, since the number of words appearing in a certain object (document) is limited, the object feature vector $x_i$ is a sparse vector. That is, the object feature vector $x_i$ is a vector of which the number of non-zero elements is very small.

Thus, when a large number of documents are clustered, a data (object feature vector) set, which is a clustering target, is a large-scale set, and each object feature vector becomes a high-dimensional sparse vector. Hereinafter, such high-dimensional and sparse data is referred to as "high-dimensional sparse data", and a large-scale set of this high-dimensional sparse data is also referred to as a "large-scale high-dimensional sparse data set". In the embodiment of the present invention, such a large-scale high-dimensional sparse data set is a clustering target.

In addition, for example, a purchase history indicating a relationship between a purchaser (or a user) and a purchased item (or an item), an image of which extracted features are represented by bag-of-visual words, and the like are also objects, and can be treated like the above documents. That is, a feature vector of a large amount of purchase history, a feature vector of a large number of images represented by bag-of-visual words, or the like is also a large-scale high-dimensional sparse data set.

(2) Lloyd Method

An overview of the Lloyd method is as follows. K is the given number of clusters.

S1: (Initial state setting step): K mean feature vectors $\mu_j$ (j=1, 2, ..., K) are initialized to appropriate values.

S2: (Assignment step) A distance (or a square thereof) between the mean feature vector $\mu_j$ of a current iteration and the object feature vector $x_i$ is calculated for each object feature vector $x_i$, and the object feature vector $x_i$ is assigned to the cluster $C_j$ corresponding to the mean feature vector $\mu_j$ with the shortest distance. The iteration is the number of iterations (or the number of repetitions) of S2 and S3, as will be described below.

The distance between the mean feature vector $\mu_j$ and the object feature vector $x_i$ is calculated using Equation (1) below, for example.

[Formula 1]

$$\|x_i - \mu_j\|^2 = \|x_i\|^2 + \|\mu_j\|^2 - 2x_i^T \mu_j \qquad (1)$$

Here, T represents transposition. The first term and the second term on the right side of Equation (1) above are squares of norms of $x_i$ and $\mu_j$, respectively, and $x_i^T \mu_j$ of the third term represents a dot product or an inner product.

S3: (Updating step) After the assignment of all object feature vectors $x_i$ is completed, the mean feature vector $\mu_j$ is calculated and updated by the object feature vector $x_i$ belonging to each cluster $C_j$.

S4: (End determination step) A determination is made as to whether or not a predetermined ending condition is satisfied, and the process ends when the determination is made that the predetermined ending condition is satisfied, whereas the process returns to the assignment step of S2 when the determination is made that the predetermined ending condition is not satisfied. Thereby, S2 and S3 are repeatedly executed until the predetermined ending condition is satisfied. This repetition is also called an iteration, an iteration currently being executed is referred to as a "current iteration", and an iteration executed immediately before the current iteration is referred to as a "previous iteration". An example of the predetermined ending condition may be a case in which the cluster $C_j$ to which all the object feature vectors $x_i$ belong is invariant.

Here, the Lloyd method requires a large amount of time calculation in the assignment step of S2. Therefore, it is necessary for a time required for the assignment step, that is, a time required for calculation of distances between all the object feature vectors $x_i$ and all the mean feature vectors $\mu_j$, to be reduced in order to achieve a high speed of the Lloyd method. As described above, in the distance calculation, it is necessary to calculate a square of a norm of $x_i$ and $\mu_j$ and the inner product of $x_i^T \mu_j$. Since the square of the norm can be calculated in advance, it is important to reduce a time required for the inner product calculation in order to reduce the time required for the distance calculation.

Therefore, a method of reducing the time required for the inner product calculation by representing at least the object feature vector $x_i$ in a predetermined data structure will be described in the embodiment of the present invention. Further, a method of reducing a memory capacity required for the inner product calculation by representing at least the object feature vector $x_i$ in a predetermined data structure will be described in the embodiment of the present invention. With these methods, the clustering device 10 in the embodiment of the present invention can efficiently cluster the large-scale high-dimensional sparse data set.

<Functional Configuration>

Next, a functional configuration of the clustering device 10 according to the embodiment of the present invention will be described with reference to FIG. 1. FIG. 1 is a diagram illustrating an example of the functional configuration of the clustering device 10 according to the embodiment of the present invention.

The clustering device 10 according to the embodiment of the present invention includes a preprocessing unit 110 and a clustering processing unit 120, as illustrated in FIG. 1. The preprocessing unit 110 and the clustering processing unit 120 are realized through a process that one or more programs installed in the clustering device 10 cause a central processing unit (CPU) to execute. The preprocessing unit 110 and the clustering processing unit 120 may be realized through a process that a different program causes the CPU to execute.

Further, the clustering device 10 according to the embodiment of the present invention includes a storage unit 130. The storage unit 130 can be realized using, for example, an auxiliary storage device or a random access memory (RAM).

The preprocessing unit 110 represents each object feature vector $x_i$ of an input object feature vector set $X=\{x_1, x_2, \ldots, x_n\}$ in a data structure configured of a sequence of pairs (tuples) of a position of a non-zero element (for example, a feature ID (or a feature identifier) for uniquely identifying each of different words when the object is a document) and a value of a non-zero element (for example, a feature quantity represented by a tf-idf value when the object is a document). The input object feature vector set X is a large-scale high-dimensional sparse data set.

The object feature vector represented in the above data structure is referred to as an "object feature vector in sparse representation". On the other hand, an object feature vector having all the feature IDs appearing in the object feature vector set X as dimensions (that is, a high-dimensional object feature vector), which is not in sparse representation, is referred to as an "object feature vector in complete representation". Hereinafter, the object feature vector in sparse representation is also be represented as $x_i$ (i=1, 2, . . . , n). The set X of object feature vectors $x_i$ in sparse representation is stored in the storage unit 130, for example.

The clustering processing unit 120 receives the set X of object feature vectors $x_i$ in sparse representation and the number K of clusters as an input, and clusters (or divides) the object feature vector $x_i$ in sparse representation into K clusters. Here, the clustering processing unit 120 includes an input unit 121, an initial setting unit 122, an assignment unit 123, an updating unit 124, an end determination unit 125, and an output unit 126.

The input unit 121 inputs the set X of object feature vectors $x_i$ in sparse representation and the number K of clusters. The input unit 121 inputs, for example, the set X and the number K of clusters from the storage unit 130. However, the input unit 121 may input, for example, the set X or the number K of clusters output from another device, another program, or the like.

The initial setting unit 122 performs a process corresponding to the initial state setting step described above. The assignment unit 123 performs a process corresponding to the assignment step described above. The updating unit 124 performs a process corresponding to the updating step described above. The end determination unit 125 performs a process corresponding to the above-described end determination step.

The output unit 126, for example, outputs a result of assigning the object feature vector $x_i$ in sparse representation to the cluster $C_j$ (which can be equated with a result of clustering the objects). The output unit 126 may output the mean feature vector $\mu_j$ of each cluster $C_j$. An output destination of the output unit 126 is not limited. Specific examples of the output destination include a display, an auxiliary storage device, an external recording medium, and other devices connected via a network.

A case in which the clustering device 10 includes the preprocessing unit 110 as an example is illustrated in FIG. 1, but the present invention is not limited thereto. For example, the clustering device 10 may not include the preprocessing unit 110, and another device may include the preprocessing unit 110. In this case, the clustering processing unit 120 of the clustering device 10 may input the set X of object vectors $x_i$ in sparse representation created by the preprocessing unit 110 of the other device.

<Hardware Configuration>

Figure 2:
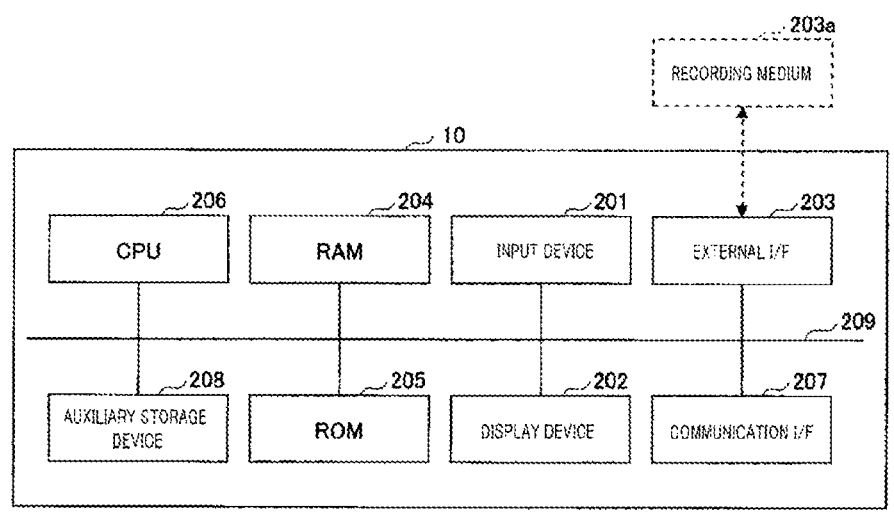
FIG. 2 is a diagram illustrating an example of a hardware configuration of the clustering device according to the embodiment of the present invention.

Next, a hardware configuration of the clustering device 10 according to the embodiment of the present invention will be described with reference to FIG. 2. FIG. 2 is a diagram illustrating an example of the hardware configuration of the clustering device 10 according to the embodiment of the present invention.

As illustrated in FIG. 2, the clustering device 10 in the embodiment of the present invention includes an input device 201, a display device 202, an external I/F 203, a RAM 204, a read only memory (ROM) 205, a CPU 206, a communication I/F 207, and an auxiliary storage device 208. Each of these pieces of hardware is communicatively connected via a bus 209.

The input device 201 is, for example, a keyboard, a mouse, or a touch panel, and is used for a user to perform an input to various devices. The display device 202 is, for example, a display, and displays, for example, a processing result of the clustering device 10. The clustering device 10 may not include at least one of the input device 201 and the display device 202.

The external I/F 203 is an interface with an external device. The external device includes a recording medium 203a or the like. The clustering device 10 can perform, for example, reading or writing on the recording medium 203a via the external I/F 203. One or more programs for realizing each functional unit included in the clustering device 10 in the embodiment of the present invention, for example, may be stored in the recording medium 203a.

Examples of the recording medium 203a include a flexible disk, a compact disc (CD), a digital versatile disk (DVD), an SD memory card (Secure Digital memory card), and a Universal Serial Bus (USB) memory card.

The RAM 204 is a volatile semiconductor memory that temporarily holds programs or data. The ROM 205 is a non-volatile semiconductor memory that can hold programs or data even when power is turned off. Operating system (OS) settings or network settings, for example, are stored in the ROM 205. The CPU 206 is a calculation device that reads the programs or data from the ROM 205, the auxiliary storage device 208, or the like into the RAM 204 and executes a process.

The communication I/F 207 is an interface for the clustering device 10 to communicate with other devices. The one or more programs for realizing each functional unit included in the clustering device 10 in the embodiment of the present invention may be acquired (downloaded) from a predetermined server or the like via the communication I/F 207, for example. Further, the clustering device 10 in the embodiment of the present invention may provide one or more programs for realizing each functional unit to another device via the communication I/F 207, for example.

The auxiliary storage device 208 is, for example, a hard disk drive (HDD) or a solid state drive (SSD), and is a non-volatile storage device that stores programs or data. Examples of the programs or data stored in the auxiliary storage device 208 include an OS, an application program for realizing various functions on the OS, and one or more programs for realizing each functional unit included in the clustering device 10 in the embodiment of the present invention.

The clustering device 10 in the embodiment of the present invention can realize various processes to be described below by having a hardware configuration illustrated in FIG. 2.

<Preprocessing>

Figure 3:
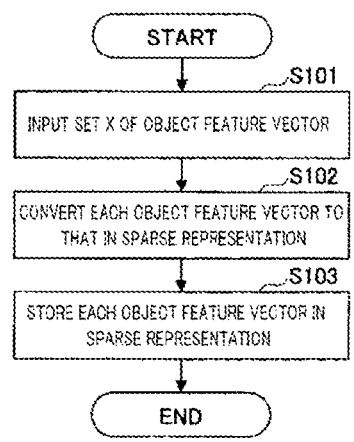
FIG. 3 is a flowchart illustrating an example of preprocessing in the embodiment of the present invention.

First, preprocessing for converting the object feature vector $x_i$ in complete representation to the object feature vector $x_i$ in sparse representation will be described with reference to FIG. 3. FIG. 3 is a flowchart illustrating an example of preprocessing in the embodiment of the present invention.

Step S101: First, the preprocessing unit 110 inputs the set $X=\{x_1, x_2, \ldots, x_n\}$ of the object feature vector $x_i$ in complete representation. The object feature vector set X is a large-scale high-dimensional sparse data set.

Step S102: Then, the preprocessing unit 110 converts each object feature vector $x_i$ in complete representation to that in a sparse representation. However, when input data is already in sparse representation, the sparse representation is used without performing this conversion.

Figure 4:
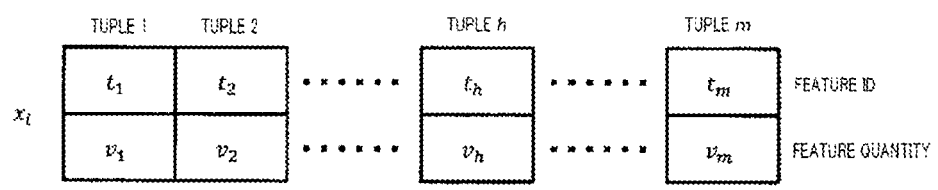
FIG. 4 is a diagram illustrating an example of an object feature vector in sparse representation.

An example of the object feature vector $x_i$ in sparse representation will be described herein with reference to FIG. 4. FIG. 4 is a diagram illustrating an example of the object feature vector $x_i$ in sparse representation.

As illustrated in FIG. 4, the object feature vector $x_i$ in sparse representation includes a sequence of sets (tuples) of feature IDs indicating positions of non-zero elements and feature quantities indicating values of the non-zero elements. In FIG. 4, a sparse representation configured of a sequence of sets (tuples) of a feature ID "$t_h$" of the non-zero element and the feature quantity "$v_h$" of the feature ID, in which $h=1, 2, \ldots, m$, when the number of non-zero elements of the object feature vector $x_i$ in complete representation is m is illustrated. Each feature ID "$t_h$" and each feature quantity "$v_h$" depend on an index i of the object feature vector $x_i$ and thus, to be exact, the feature ID and the feature quantity are represented as "$t_{ih}$" and "$v_{ih}$," respectively, but in the embodiment of the present invention, "$t_h$," "$v_h$," and the index i are omitted in representation unless otherwise specified.

Here, it is preferable for the feature IDs to be sorted in ascending order, as in $1 \leq t_1 < t_2 < \ldots < t_h < \ldots < t_n \leq D$. D is the number of dimensions of the feature space in which each object feature vector $x_i$ is present (that is, the number of different words included in a document set when the object is a document). With this sorting, it is possible to reduce an amount of inner product calculation to be described below. Hereinafter, it is assumed that the respective feature IDs of the object feature vectors $x_i$ in sparse representation are sorted in ascending order as described above.

It is possible to curb a memory size (that is, a storage capacity of the storage unit 130) used by the set X of the object feature vectors $x_i$ in sparse representation by using the object feature vector $x_i$ in sparse representation. For example, when the number of objects is n, the number of dimensions of the feature space in which each object feature vector $x_i$ is present is D, sparsity of the object feature vector $x_i$ is $S_x(i)$ ($0 \leq S_x(i) \leq 1$), an element number of the object feature vector $x_i$ is represented using an integer (that is, represented using an integer type int size memory capacity), and the feature quantity is represented using a double precision floating point (that is, represented using a memory capacity having a double precision floating point type double size), memory usage in complete representation and sparse representation is as follows.

Complete representation: $n \times D \times (sizeof(\text{double}))$ bytes [Formula 2]

Sparse representation:

$$D \times \left( \sum_{i=1}^{n} (1 - S_x(i)) \right) \times (sizeof(\text{int}) + sizeof(\text{double})) \text{ bytes}$$

Here, sizeof is a function that returns a memory size of a type passed as an argument.

The memory usage in the case of complete representation and sparse representation is compared below.

Specifically, when the memory usage depends on a computer system, but as an example, sizeof(int)=4 bytes, sizeof(double)=8 bytes, and a mean sparsity $S_x$ of all object feature vectors $x_i$ is $$S_x = (1/n) \times \left( \sum_{i=1}^{n} S_x(i) \right) = 0.9,$$ [Formula 3]

the memory usage in complete representation is 8×n×D bytes, and the memory usage in sparse representation is 1.2×n×D bytes. However, each element of the tuple is held in one array.

Therefore, it is possible to curb the memory usage to about 1/7 with each object feature vector $x_i$ in sparse representation.

In the case of complete representation, it is assumed that an index of the array storing each element of the object feature vector $x_i$ and an identifier for uniquely identifying the object (this identifier is also referred to as an "object ID") match. That is, it is assumed that each element (feature quantity) of an object feature vector $x_k$ corresponding to an object with an object ID "k" is stored in a k-th array of which the number of elements is D (specifically, an array $v_k[d]$, $0 \le d \le D-1$). Further, sparsity $S_x(i)$ of the object feature vector $x_i$ is defined as $S_x(i)=1.0-(nnz_i)/D$. Here, $nnz_i$ is the number of non-zero elements of the object feature vector $x_i$.

For example, when a large number of documents are objects, the mean sparsity $S_x$ is generally very great, and may exceed 0.99. For example, when the number of documents is 1 million, the number of different words is 500,000, and an average of about 200 words appear in one document, the mean sparsity $S_x=1-200/5\times10^6=0.99995$. The memory usage in this case is $6\times10^{-4}\times n\times D$ bytes. Thus, it is possible to efficiently use the memory by using the sparse representation. In particular, when large-scale high-dimensional sparse data is a clustering target, n and D are both very great, and thus conversion of each object feature vector $x_i$ in complete representation to that in sparse representation is especially effective from the viewpoint of efficient use of a memory corresponding to a space calculation amount.

Step S103: Then, the preprocessing unit 110 stores each object feature vector $x_i$ converted to the sparse representation in step S102 described above in the storage unit 130.

As described above, the clustering device 10 in the embodiment of the present invention creates the object feature vector $x_i$ in sparse representation as preprocessing. Thereby, as described above, it is possible to curb a memory usage (that is, the storage capacity of the storage unit 130) required for the object feature vector $x_i$.

In the embodiment of the present invention, the clustering device 10 converts each object feature vector $x_i$ in complete representation to that in sparse representation or creates the object feature vector $x_i$ in sparse representation as preprocessing, but the present invention is not limited thereto. For example, another device different from the clustering device 10 may perform steps S101 and S102 described above, and then the clustering device 10 may perform only step S103 described above.

<Clustering Process>

Hereinafter, a clustering process in the embodiment of the present invention will be described.

Example 1

Figure 5:
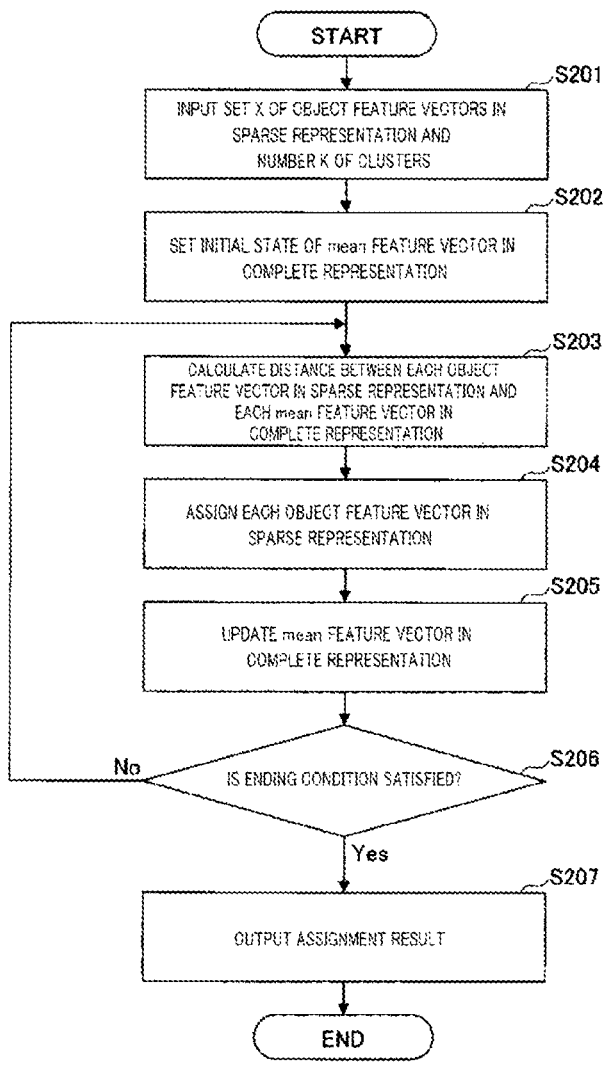
FIG. 5 is a flowchart (Example 1) illustrating an example of the clustering process in the embodiment of the present invention.

First, a case in which the object feature vectors $x_i$ in sparse representation are clustered as Example 1 of clustering processing will be described with reference to FIG. 5. FIG. 5 is a flowchart (Example 1) illustrating an example of the clustering process in the embodiment of the present invention.

Step S201: First, the input unit 121 of the clustering processing unit 120 inputs the set X of object feature vectors $x_i$ in sparse representation and the number K of clusters. It is assumed that $|X|=n$ and K is an integer and $1<K<n$.

Step S202: Then, the initial setting unit 122 of the clustering processing unit 120 initializes each mean feature vector $\mu_j$ (j=1, 2, ..., K) to an appropriate value. Any method may be used as an initialization method. For example, each mean feature vector $\mu_j$ may be initialized to a random value, any K different object feature vectors $x_i$ may be set as respective mean feature vectors $\mu_j$, or each object feature vector $x_i$ in sparse representation may be randomly assigned to the cluster $C_j$, and then the mean feature vector $\mu_j$ may be calculated from $x_i$ belonging to each cluster $C_j$ for initialization. The initialized mean feature vector $\mu_j$ is stored in the storage unit 130, for example.

Figure 6:
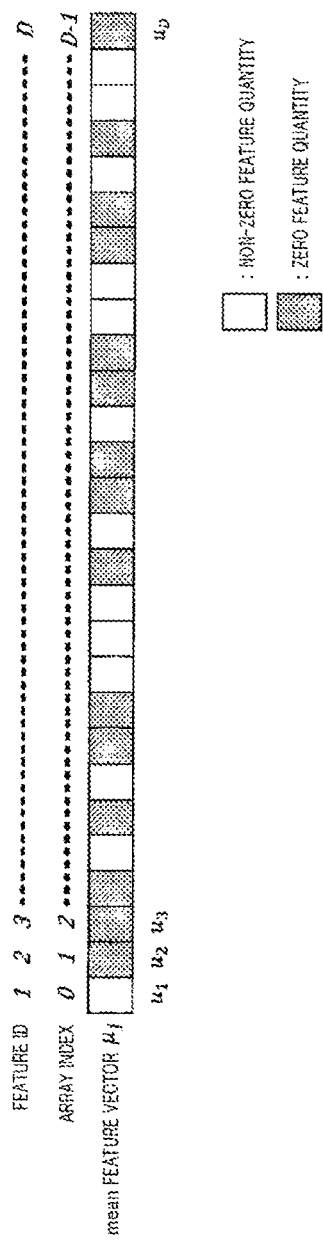
FIG. 6 is a diagram illustrating an example of a mean feature vector in complete representation.

Here, in Example 1, each mean feature vector $\mu_j$ is assumed to be in complete representation. An example of the mean feature vector $\mu_j$ in complete representation will be described with reference to FIG. 6. FIG. 6 is a diagram illustrating an example of the mean feature vector $\mu_j$ in complete representation.

As illustrated in FIG. 6, the mean feature vector $\mu_j$ in complete representation is data (high-dimensional data) represented by a D-dimensional vector including an element $u_d$ (d=1, 2, ..., D) of which the feature quantity is zero.

In the mean feature vector $\mu_j$ in complete representation, it is assumed that the feature quantity $u_{d+1}$ with a feature ID of d+1 is stored in the d-th element of the array (that is, the element of the array with an array index of d). Hereinafter, the elements of the array are referred to as "array elements" in order to distinguish the elements of the array from vector elements.

Specifically, for example, when the mean feature vector $\mu_j$ in complete representation is realized by the array $w_j[d]$, $0 \le d \le D-1$, the feature quantity $u_{d'+1}$ having a feature ID of d'+1 is stored in a d'-th array element $w_j[d']$. Each feature quantity "$u_d$" depends on an index j of the mean feature vector $\mu_j$ and thus, to be exact, the feature quantity is represented as "$u_{jd}$", but in the embodiment of the present invention, the feature quantity is represented as "$u_d$" and the index j is omitted unless otherwise specified.

Figure 7:
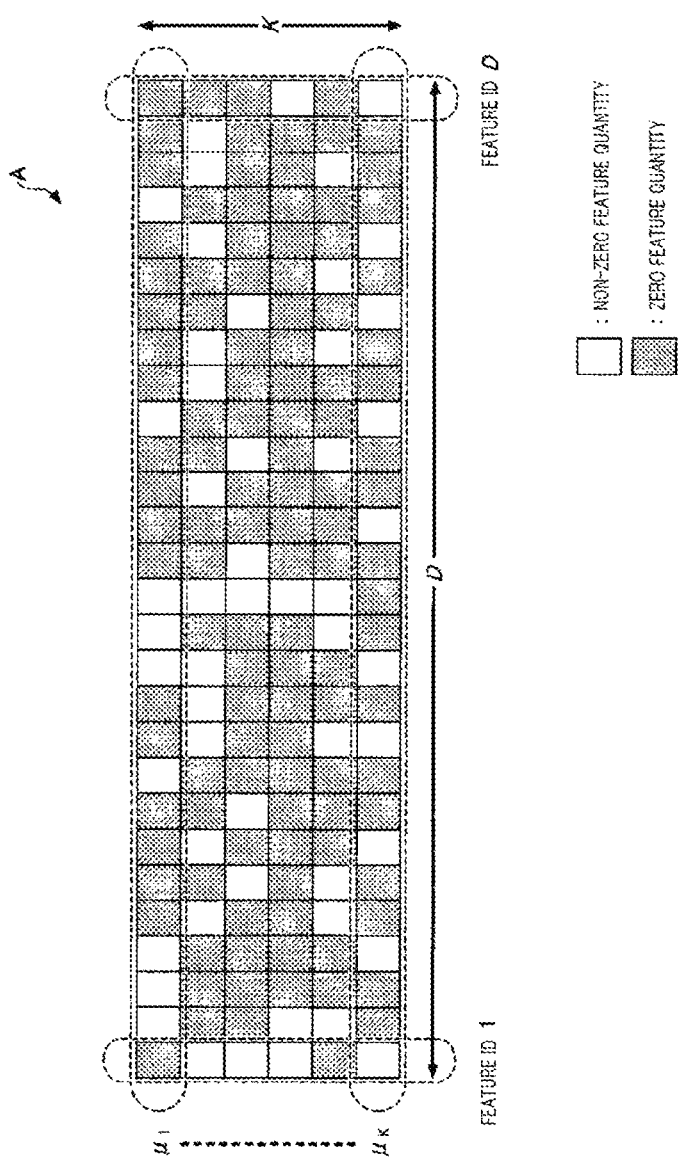
FIG. 7 is a diagram illustrating an example of K mean feature vectors in complete representation.

Here, the K mean feature vectors $\mu_j$ (j=1, 2, ..., K) in complete representation can also be represented by a K×D matrix A. An example of a case in which the K mean feature vectors $\mu_j$ in complete representation are represented by the K×D matrix A is illustrated in FIG. 7. As illustrated in FIG. 7, the matrix A is a matrix in which a j-th row is the mean feature vector $\mu_j$ in complete representation.

For the mean feature vector $\mu_j$ in complete representation, memory usage is large because elements of which a feature quantity is zero are also stored in the array, but it is possible to apply a simple calculation method in inner product calculation to be described below, and to curb an increase in an amount of time calculation. This calculation method is the same as representation of a dot product of level 1 of a Sparse Basic Linear Algebra Subprograms (BLAS) library described in Reference 1 below, and corresponds to a case in which an argument of sparse representation of the dot product of the sparse BLAS is the object feature vector $x_i$, and an argument of complete representation is the mean feature vector $\mu_j$.

[Reference 1] D. S. Dodson, R. G. Grimes, and J. G. Lewis, "Sparse extensions to the FORTRAN Basic Linear Algebra Subprograms", ACM Trans. Mathematical Software, vol. 17, no. 2, pp. 253-263, June 1991.

Steps S203 to S206 below are repeatedly executed until the predetermined ending condition is satisfied by the clustering processing unit 120.

Step S203: The assignment unit 123 of the clustering processing unit 120 calculates the distance between each of the object feature vectors $x_i$ in sparse representation and the mean feature vector $\mu_j$ in complete representation of the current iteration. Here, a definition of the distance is as in Equation (1) described above. Since the square of the norm can be calculated in advance as described above, the inner product calculation will be described below.

In a method of the related art, since the object feature vector $x_i$ is in a complete representation (that is, a D-dimensional vector also including zero elements), a multiplication value of elements having the same index (the same element index) of the object feature vector $x_i$ and the mean feature vector $\mu_j$ is obtained in the inner product calculation. That is, the element index of the object feature vector $x_i$ and the element index of the mean feature vector $\mu_j$ match. On the other hand, in Example 1, since the object feature vector $x_i$ is compressively represented (in sparse representation) in a form including no non-zero elements, the element index of the object feature vector $x_i$ in sparse representation and the element index of the mean feature vector $\mu_j$ in complete representation do not match. However, as illustrated in FIG. 6, a correspondence relationship between the array index of the mean feature vector $\mu_j$ in complete representation and the feature ID is fixed (in the example illustrated in FIG. 6, a value obtained by subtracting 1 from the feature ID is an array index). Therefore, the element index of the mean feature vector $\mu_j$ that is a multiplication target can be uniquely specified from a value of the feature ID of the object feature vector $x_i$ in sparse representation.

Figure 8:
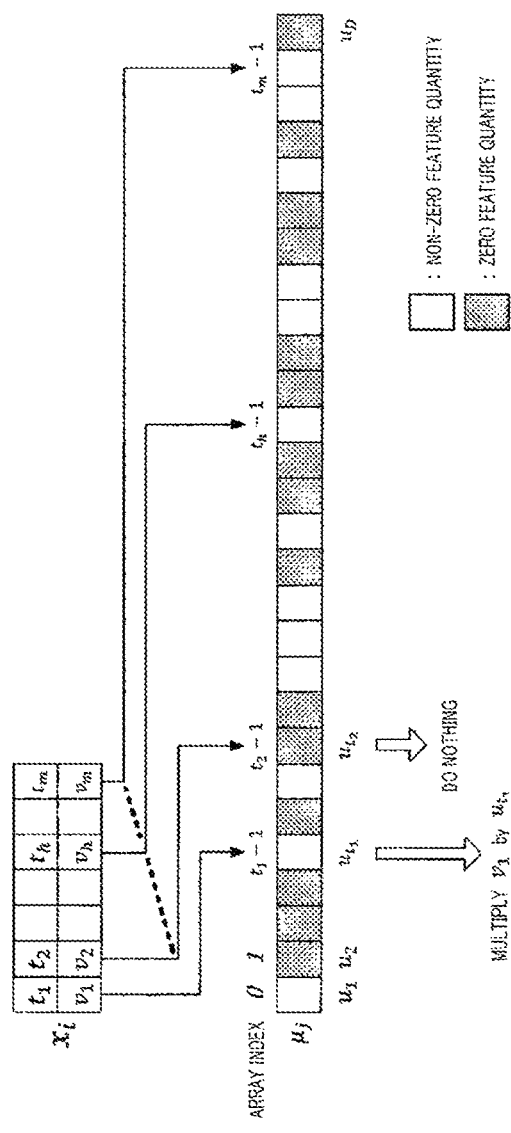
FIG. 8 is a diagram (Example 1) illustrating an example of inner product calculation of an object feature vector in sparse representation and a mean feature vector in complete representation.

Therefore, in Example 1, the inner product is calculated as follows. Hereinafter, a case in which the inner product of the object feature vector $x_i$ in sparse representation and the mean feature vector $\mu_j$ in complete representation illustrated in FIG. 8 is calculated as an example will be described.

Step S203-1: The assignment unit 123 accesses a $(t_h-1)$-th array element of the mean feature vector $\mu_j$ in complete representation using the feature ID "$t_h$" corresponding to the feature quantity $v_h$ of the object feature vector $x_i$ in sparse representation.

Step S203-2: The assignment unit 123 determines whether or not the feature quantity $u_{th}$ stored in the array element accessed in the above S203-1 is zero.

Step S203-3: When the assignment unit 123 determines that the feature quantity $u_{th}$ is not zero, the assignment unit 123 calculates a multiplication of the feature quantity $u_{th}$ and the feature quantity $v_h$. On the other hand, when the assignment unit 123 determines that the feature quantity $u_{th}$ is zero, the assignment unit 123 performs nothing.

The assignment unit 123 repeatedly executes steps S203-1 to S203-3 described above for each $h=1, 2, \ldots, m$.

Step S203-4: The assignment unit 123 sums multiplication results calculated for the respective h in step S203-3 described above. Accordingly, the inner product of the object feature vector $x_i$ in sparse representation and the mean feature vector $\mu_j$ in complete representation is calculated.

According to the inner product calculation described in steps S203-1 to S203-4 above, it is possible to reduce the number of multiplications in the inner product calculation, and to efficiently perform the inner product calculation in Example 1. For example, in the example illustrated in FIG. 8, the number of accesses to the array elements of the mean feature vector $\mu_j$ in complete representation is m (the number of elements of the object feature vector $x_i$ in sparse representation), and the number of multiplications is the number of non-zero elements a m) among the accessed elements of the mean feature vector $\mu_j$ in complete representation.

According to a CPU architecture or the like, a calculation speed may be higher in performing the multiplication process than in the determination as to whether or not the feature quantity $u_{th}$ is zero in step S203-2 described above. In such a case, the assignment unit 123 may calculate the multiplication of the feature quantity $u_{th}$ and the feature quantity $v_h$ in step S203-3 described above without performing the determination of step S203-2 described above (that is, regardless of whether or not the feature quantity $u_{th}$ is zero).

Figure 9:
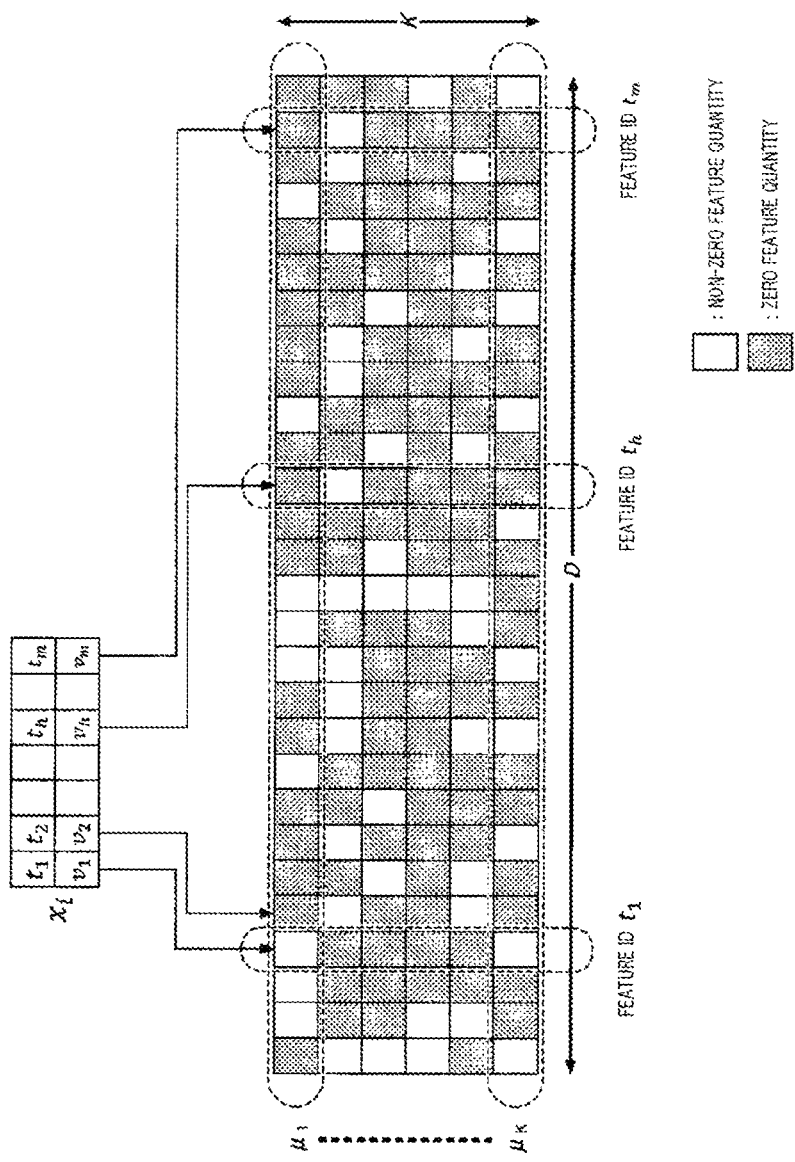
FIG. 9 is a diagram (Example 1) illustrating an example of calculation of an inner product of the object feature vector in sparse representation and K mean feature vectors in complete representation.

The inner product calculation described above is performed on the K mean feature vectors $\mu_j$ in complete representation for each of the object feature vectors $x_i$ in sparse-representation. The calculation of the inner product of a certain object feature vector $x_i$ in sparse representation and K mean feature vectors $\mu_j$ in complete representations is illustrated in FIG. 9. As illustrated in FIG. 9, for $j=1, 2, \ldots, K$, the inner product of the object feature vector $x_i$ in sparse representation and each mean feature vector $\mu_j$ in complete representation is repeatedly calculated. In this case, the number of accesses to the array elements of the K mean feature vector $\mu_j$ in complete representation is m×K, and the number of multiplications is as follows.

$$\sum_{j=1}^{K} \alpha_j(m) \quad \text{[Formula 4]}$$

Here, $\alpha_j(m)$ is the number of non-zero elements among the accessed elements of the mean feature vector $\mu_j$ in complete representation. In other words, $\alpha_j(m)$ is the number of elements of which the feature quantity of the mean feature vector $\mu_j$ is non-zero among elements in a common set of the set $\{t_1, \ldots, t_m\}$ and the set $\{1, \ldots, D\}$ of feature IDs of the mean feature vector $\mu_j$ in complete representation.

Step S204: The assignment unit 123 of the clustering processing unit 120 assigns the object feature vector $x_i$ to the cluster $C_j$ corresponding to the mean feature vector $\mu_j$ in complete representation of which the distance calculated in step S203 is smallest, for each of the object feature vectors $x_i$ in sparse representation. The result of assigning each object feature vector $x_i$ in sparse representation to the cluster $C_j$ is stored in, for example, the storage unit 130.

Step S205: The updating unit 124 of the clustering processing unit 120 calculates and updates the mean feature vector $\mu_j$ in complete representation with the object feature vector $x_i$ in sparse representation belonging to each cluster $C_j$.

For example, for each cluster $C_j$, the updating unit 124 may calculate a mean of the object feature vector $x_i$ in sparse representation that belongs to the cluster $C_j$, and set this mean as the mean feature vector $\mu_j$. Here, the mean of the object feature vector $x_i$ in sparse representation is a mean value of the feature quantities for respective feature IDs for the object feature vectors $x_i$ in sparse representation belonging to the same cluster $C_j$. A feature quantity of an element corresponding to a feature ID of which the mean value is not calculated among the elements of the mean feature vector $\mu_j$ may be zero.

Step S206: The end determination unit 125 of the clustering processing unit 120 determines whether or not a predetermined ending condition is satisfied. Then, when the end determination unit 125 determines that the predetermined ending condition is satisfied, the clustering processing unit 120 proceeds to step S207. On the other hand, when the end determination unit 125 determines that the predetermined ending condition is not satisfied, the clustering processing unit 120 adds 1 to the iteration and then returns to step S203.

Step S207: The output unit 126 of the clustering processing unit 120 outputs, for example, the result of assigning the object feature vector $x_i$ in sparse representation to the cluster $C_j$.

As described above, the clustering device 10 in the embodiment of the present invention can cluster the object feature vector $x_i$ in sparse representation through the clustering process in Example 1. In this case, with the object feature vector $x_i$ in sparse representation, it is possible to curb the memory usage and to reduce the number of multiplications in the inner product calculation as described above, and thus, it is possible to perform efficient clustering.

Example 2

Figure 10:
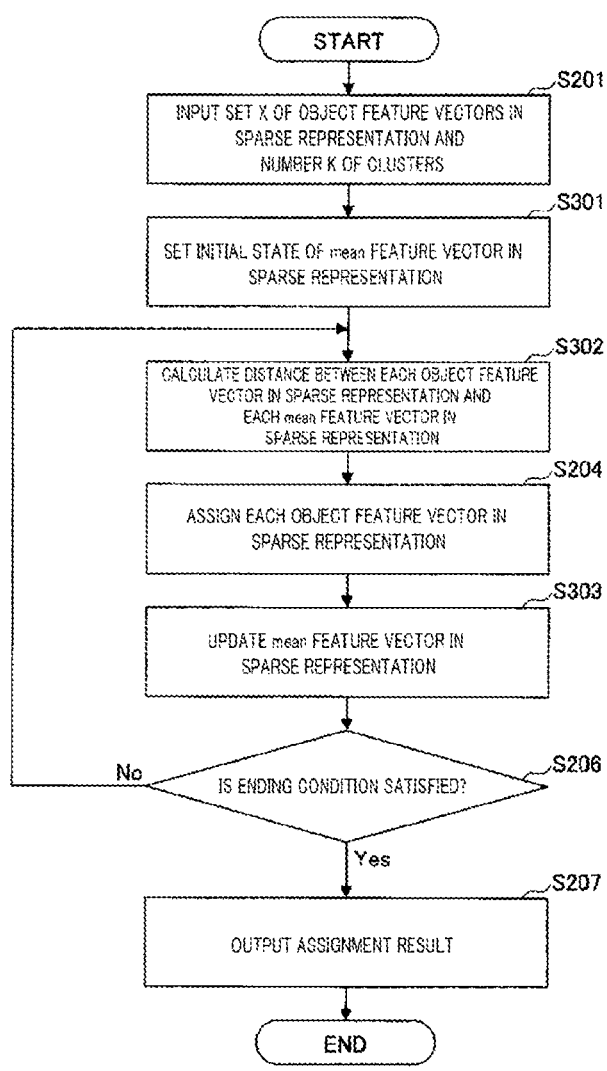
FIG. 10 is a flowchart (Example 2) illustrating an example of the clustering process in the embodiment of the present invention.

Next, a case in which the mean feature vector $\mu_j$ is also in sparse representation as Example 2 of the clustering process will be described with reference to FIG. 10. FIG. 10 is a flowchart (Example 2) illustrating an example of the clustering process in the embodiment of the present invention. Since step S201, step S204, and steps S206 to S207 in FIG. 10 are the same as those in Example 1, description thereof will be omitted.

Step S301: The initial setting unit 122 of the clustering processing unit 120 initializes each mean feature vector $\mu_j$ (j=1, 2, . . . , K) in sparse representation to an appropriate value. As the initialization method, the same method as in Example 1 may be used. The initialized mean feature vector $\mu_j$ in sparse representation is stored in, for example, the storage unit 130.

Figure 11:
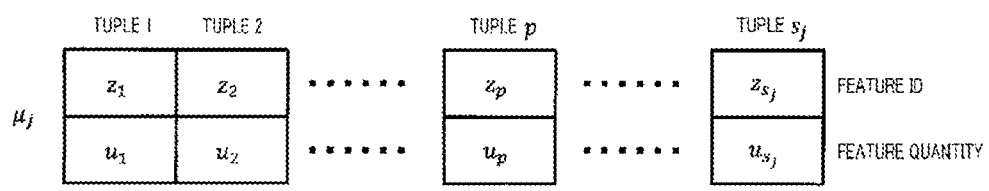
FIG. 11 is a diagram illustrating an example of a mean feature vector in sparse representation.

An example of the mean feature vector $\mu_j$ in sparse representation will be described herein with reference to FIG. 11. FIG. 11 is a diagram illustrating an example of the mean feature vector $\mu_j$ in sparse representation.

As illustrated in FIG. 11, the mean feature vector $\mu_j$ in sparse representation includes a sequence of pairs (tuples) of a feature ID indicating a position of a non-zero element and a feature quantity indicating a value of the non-zero element. In FIG. 11, the sparse representation composed of a sequence of pairs (tuples) of a feature ID "$z_p$" of the non-zero element and a feature quantity "$u_p$" of the feature ID in which p=1, 2, . . . , $s_j$ when the number of non-zero elements of the mean feature vector $\mu_j$ in complete representation is $s_j$ is shown. Each feature ID "$z_p$" and feature quantity "$u_p$" depend on the index j of the mean feature vector $\mu_j$ and thus, to be exact, the feature ID "$z_p$" and the feature quantity "$u_p$" are represented as "$z_{jp}$" and "$u_{jp}$", respectively. However, in the embodiments of the present invention, "$z_{jp}$", "$u_{jp}$", and the index j are omitted in representation unless otherwise specified. It is preferable for the feature IDs to be sorted in ascending order, for example, $1 \leq z_1 < z_2 < \ldots < z_p < \ldots < z_{sj} \leq D$. Hereinafter, it is assumed that the feature IDs of the mean feature vector $\mu_j$ in sparse representation are sorted in ascending order as described above.

It is possible to curb the memory size (that is, the storage capacity of the storage unit 130) used by the mean feature vector $\mu_j$ in sparse representation by using the mean feature vector $\mu_j$ in sparse representation.

Step S302: The assignment unit 123 of the clustering processing unit 120 calculates a distance between each object feature vector $x_i$ in sparse representation and the mean feature vector $\mu_j$ in sparse representation of the current iteration. Here, a definition of the distance is as in Formula (1) described above. Since the square of the norm can be calculated in advance as described above, the inner product calculation will be described below.

In Example 2, since both the object feature vector $x_i$ and the mean feature vector $\mu_j$ are in sparse representation, the same non-zero element positions are searched for and the inner product is calculated by multiplying the feature quantities for the respective non-zero element positions. Hereinafter, as an example, a case in which the inner product of the object feature vector $x_i$ illustrated in FIG. 4 and the mean feature vector $\mu_j$ illustrated in FIG. 11 is calculated will be described. Further, it is assumed that each tuple of the object feature vector $x_i$ in sparse representation is stored in the array $v_i[h]$, $0 \leq h \leq m-1$, and each tuple of the mean feature vector $\mu_j$ in sparse representation is stored in the array $w_j[p]$, $0 \leq p \leq s_j-1$. In this case, h and p are array indexes.

Step S302-1: The assignment unit 123 initializes an inner product value sum to 0. Further, the assignment unit 123 performs initialization to h=1 and p=1.

Step S302-2: The assignment unit 123 accesses an array element $v_i[h-1]$ of the array index h−1 of $x_i$ and the array element $w_j[p-1]$ of the array index p−1 of $\mu_j$, and compares a size of $t_h$ stored in the array element $v_i[h-1]$ with a size of $z_p$ stored in the array element $w_j[p-1]$.

Step S302-3: The assignment unit 123 performs any of the following (1) to (3) according to a comparison result of step S302-2 described above.

(1) When $t_h = z_p$, the assignment unit 123 sets sum←sum+$v_h$×$u_p$. Further, the assignment unit 123 performs either p←p+1 or h←h+1. In this case, preferably, when m<$s_j$, $\mu_j$ is updated. "←" represents updating the left side with the right side.

(2) When $t_h > z_p$,

The assignment unit 123 sets p←p+1.

(3) When $t_h < z_p$,

The assignment unit 123 sets h←h+1.

Step S302-4: When none of "$t_m = z_{sj}$", "h>m" and "p>$s_j$" is satisfied, the assignment unit 123 returns to step S302-2. On the other hand, the assignment unit 123 ends the process when any one of "$t_m = z_{sj}$", "h>m or (h=m and $t_h < z_{s+1}$)", and "p>$s_j$ or (p=$s_j$ and $z_p < t_{h+1}$)" is satisfied.

A sum finally obtained in steps S302-1 to S302-4 described above becomes an inner product value. In this inner product calculation, the number of accesses to the array element of the mean feature vector $\mu_j$ in sparse representation is m+$s_j$−1 (that is, O(m+$s_j$)) in the worst case. Further, the number of multiplications is the number of elements a' (m) m in a common set of a set of feature IDs $\{t_1, \ldots, t_m\}$ of the object feature vector $x_i$ in sparse representation and a set of feature IDs $\{z_1, \ldots, z_{sj}\}$ of the mean feature vector $\mu_j$ in sparse representation. Therefore, an amount of calculation slightly increases as compared with Example 1.

The inner product calculation described above is performed on K sparse representation mean feature vectors $\mu_j$ for each of the object feature vector $x_i$ in sparse representations. Therefore, the number of accesses to the array elements of the K mean feature vectors $\mu_j$ in sparse representation is $$K(m-1) + \sum_{j=1}^{K} s_j \qquad \text{[Formula 5]}$$

in the worst case. Further, the number of multiplications is a sum regarding j=1, 2, . . . , K of the number of elements in a common set of the set of feature IDs $\{t_1, \ldots, t_m\}$ of the object feature vector $x_i$ in sparse representation and the set of feature IDs $\{z_{j1}, \ldots, z_{j(sj)}\}$ of the mean feature vector $\mu_j$ in sparse representation.

$$\sum_{j=1}^{K} \alpha'_j(m) \quad \text{[Formula 6]}$$

A problem of searching for a common non-zero element position as described above is the same as a problem of obtaining a common set of a plurality of sets (a set intersection problem). As a solution to this problem, a parallel scan method that is used in a merge part of merge sort, which is a divide-and-conquer method, is known. This method can also be applied to the inner product calculation of steps S302-1 to S302-4.

Step S303: The updating unit 124 of the clustering processing unit 120 calculates and updates the mean feature vector $\mu_j$ in sparse representation with the object feature vector $x_i$ in sparse representation belonging to each cluster $C_j$.

For example, for each cluster $C_j$, the updating unit 124 may calculate a mean of the object feature vector $x_i$ in sparse representation that belongs to the cluster $C_j$, and set this mean as the mean feature vector $\mu_j$.

As described above, the clustering device 10 in the embodiment of the present invention can cluster the object feature vector $x_i$ in sparse representation through the clustering process in Example 2. In this case, in Example 2, with the mean feature vector $\mu_j$ in sparse representation, a calculation amount slightly increases as compared with Example 1, but it is possible to further curb the memory usage and, thus, it is possible to perform efficient clustering.

Example 3

Figure 12:
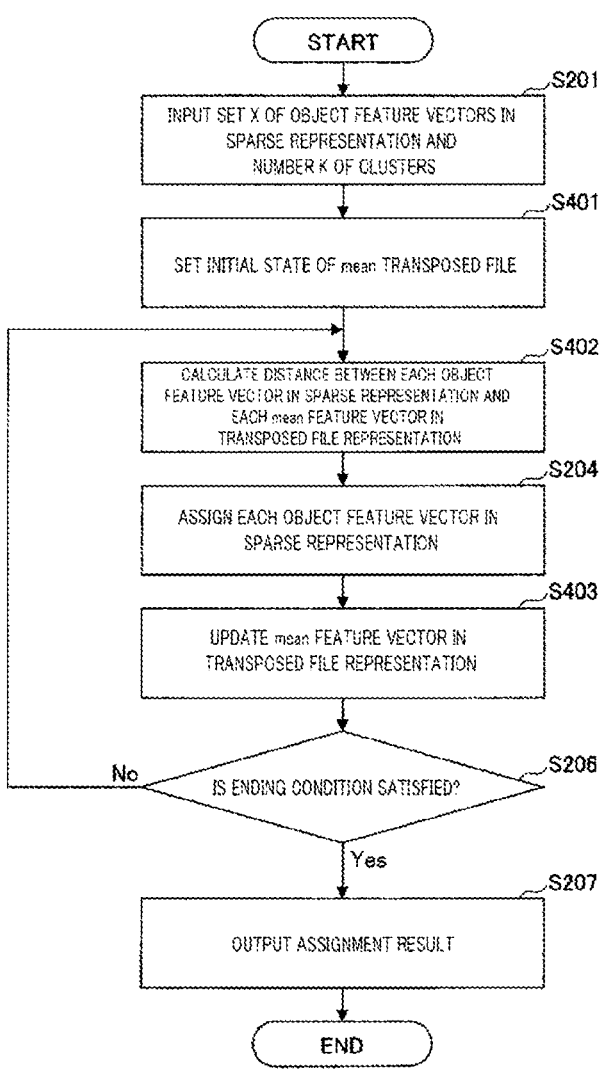
FIG. 12 is a flowchart (Example 3) illustrating an example of the clustering process in the embodiment of the present invention.

Next, a case in which the mean feature vector $\mu_j$ represented in a data structure of the transposed file (the mean feature vector represented in the data structure of the transposed file is represented as "mean feature vector in transposed file representation") is used as Example 3 of the clustering process will be described with reference to FIG. 12. FIG. 12 is a flowchart (Example 3) illustrating an example of the clustering process in the embodiment of the present invention. Since step S201, step S204, and steps S206 to S207 in FIG. 12 are the same as those in Example 1, description thereof will be omitted.

Step S401: The initial setting unit 122 of the clustering processing unit 120 initializes a mean transposed file. The mean transposed file is a transposed file in which the mean feature vector $\mu_j$ (j=1, 2, . . . , K) in transposed file representation is stored. The initialized mean transposed file is stored in the storage unit 130, for example.

Figure 13:
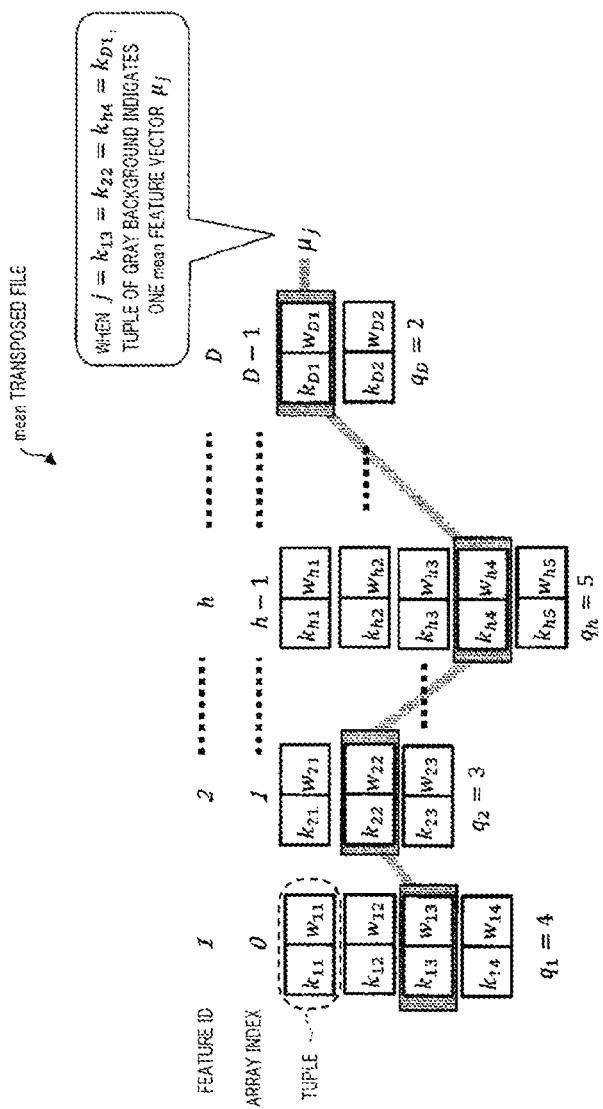
FIG. 13 is a diagram illustrating an example of a mean transposed file.

Here, an example of the mean transposed file will be described with reference to FIG. 13. FIG. 13 is a diagram illustrating an example of the mean transposed file.

As illustrated in FIG. 13, the mean transposed file includes a sequence of pairs (tuples) of meanID "$k_{hr}$" indicating the index j of the mean feature vector $\mu_j$ including the non-zero feature quantity of the feature ID "h" and the non-zero feature quantity $w_{hr}$. However, in each tuple sequence, it is assumed that the respective tuples are sorted in ascending order of $k_{hr}$. Here, $1 \leq r \leq q_h$, and $q_h$ is the number of mean feature vectors $\mu_j$ of which a feature quantity of the feature quantity ID "h" is non-zero. Further, $1 \leq h \leq D$. The meanID "$k_{hr}$" is also called a cluster ID.

In the mean transposed file having such a data structure, one mean feature vector $\mu_j$ is represented by a tuple group having the same meanID "$k_{hr}$" in each tuple sequence. Specifically, in the example illustrated in FIG. 13, when $j=k_{13}=k_{22}=k_{h4}=k_{D1}$, one mean feature vector $\mu_j$ is represented by $\{(k_{13}, w_{13}), (k_{22}, w_{22}), (k_{h4}, w_{h4}), (k_{D1}, w_{D1})\}$. Thus, since each mean feature vector $\mu_j$ is compressed into a form including no non-zero elements as in sparse representation by representing the mean feature vector $\mu_j$ using the mean transposed file, it is possible to curb a memory usage.

Step S402: The assignment unit 123 of the clustering processing unit 120 calculates the distance between each object feature vector $x_i$ in sparse representation and the mean feature vector $\mu_j$ in transposed file representation of the current iteration. Here, a definition of the distance is as in Formula (1) described above. Since the square of the norm can be calculated in advance as described above, the inner product calculation will be described below.

Figure 14:
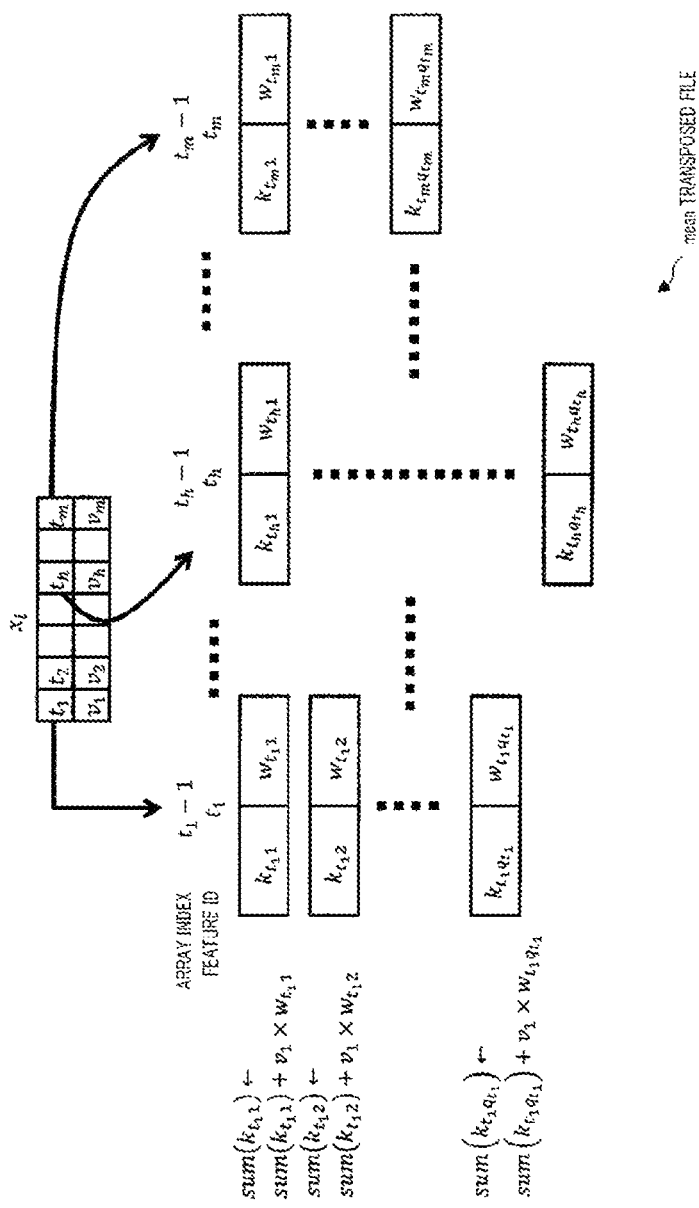
FIG. 14 is a diagram (Example 3) illustrating an example of calculation of an inner product of the object feature vector in sparse representation and a mean feature vector in transposed file representation.

Hereinafter, a case in which the inner product of the object feature vector $x_i$ in sparse representation and each mean feature vector $\mu_j$ in transposed file representation is calculated will be described with reference to FIG. 14. FIG. 14 is a diagram (Example 3) illustrating an example of calculation of an inner product of the object feature vector $x_i$ in sparse representation and the mean feature vector $\mu_j$ in transposed file representation. It is assumed that each tuple of the object feature vector $x_i$ in sparse representation is stored in the array $v_i[h]$, $0 \leq h \leq m-1$, and in transposed file representation including all mean feature vectors $\mu_j$, the feature quantity is stored in the two-dimensional array $w[h][r]$, $0 \leq h \leq D-1$ and $0 \leq r \leq q_h-1$.

Step S402-1: The assignment unit 123 initializes each inner product value sum (j) to 0. Further, the assignment unit 123 performs initialization to h=1. sum (j) is a variable in which an inner product value of the object feature vector $x_i$ in sparse representation and the mean feature vector $\mu_j$ in transposed file representation is stored.

Step S402-2: The assignment unit 123 accesses each array element $w[t_h-1][r]$, $0 \leq r \leq q_{th}-1$ (to be exact, h of "th" is a subscript notation of t (that is, $t_h$). The same applies hereinafter.) using the feature ID "$t_h$" stored in the array element $v_i[h-1]$ of the array index h−1 of $x_i$, calculates a product of the feature quantity $w_{thr}$ ($0 \leq r \leq q_{th}-1$) stored in each array element $w[t_h-1][r]$ and the feature quantity $v_h$ stored in each array element $v_i[h-1]$, and adds the product to the sum (j). That is, the assignment unit 123 performs the following calculation.

$$\text{sum } (k_{t_h1}) \leftarrow \text{sum } (k_{t_h1}) + v_h \times w_{t_h1} \quad \text{[Formula 7]}$$
$$\text{sum } (k_{t_h2}) \leftarrow \text{sum } (k_{t_h2}) + v_h \times w_{t_h2}$$
$$\ldots$$
$$\text{sum } (k_{t_hq_h}) \leftarrow \text{sum } (k_{t_hq_h}) + v_h \times w_{t_hq_h}$$

Step S402-3: The assignment unit 123 determines whether or not "h>m" is satisfied. When the assignment unit 123 determines that "h>m" is not satisfied, the assignment unit 123 sets h←h+1 and returns to step S402-2. On the other hand, when the assignment unit 123 determines that "h>m" is satisfied, the assignment unit 123 ends the process.

The sum (j) finally obtained in steps S402-1 to S402-3 described above is an inner product value of the object feature vector $x_i$ in sparse representation and the mean feature vector $\mu_j$ in transposed file representation. In this inner product calculation, the number of accesses to the tuple of the feature ID of the mean transposed file is as follows.

$$\sum_{h=1}^{m} q_{t_h} = \sum_{j=1}^{K} \alpha_j(m) \qquad \text{[Formula 8]}$$

That is, the number of accesses is a sum regarding j=1, 2, . . . , K of a common set of the set of feature IDs $\{t_1, \ldots, t_m\}$ of the object feature vector $x_i$ in sparse representation and the set of feature IDs of the mean feature vector $\mu_j$ in transposed file representation. The number of multiplications matches the number of accesses. Thus, in Example 3, the number of multiplications in the inner product calculation is the same as in Example 1, and it is possible to efficiently perform the inner product calculation. In the example illustrated in FIG. 14, although the description will be omitted for convenience of description, a maximum value of the array index is D−1.

Step S403: The updating unit 124 of the clustering processing unit 120 updates the mean transposed file with the object feature vector $x_i$ in sparse representation belonging to each cluster $C_j$. Thereby, the mean feature vector $\mu_j$ in transposed file representation is updated.

The updating unit 124, for example, may secure a memory for the mean transposed file (for example, a storage area of the storage unit 130), calculate a mean of the object feature vector $x_i$ in sparse representation belonging to the cluster $C_j$ for each of the clusters $C_j$, and then, store this mean as the mean feature vector $\mu_j$ in the mean transposed file. For securing of the memory for the mean transposed file, for example, the number of different words of the object feature vector $x_i$ belonging to each cluster $C_j$ (the number of different feature IDs) and the number of the clusters $C_j$ using the feature ID are specified, and then, a memory for holding the cluster ID of the cluster $C_j$ using the feature ID and the feature quantity of the feature ID may be secured.

As described above, the clustering device 10 in the embodiment of the present invention can cluster the object feature vector $x_i$ in sparse representation through the clustering process in Example 3. In this case, in Example 3, with the mean feature vector $\mu_j$ in transposed file representation, it is possible to make the number of multiplications in the inner product calculation to be the same as that in Example 1 while making the memory usage the same as that in Example 2, and to perform efficient clustering.

Example 4

Figure 15:
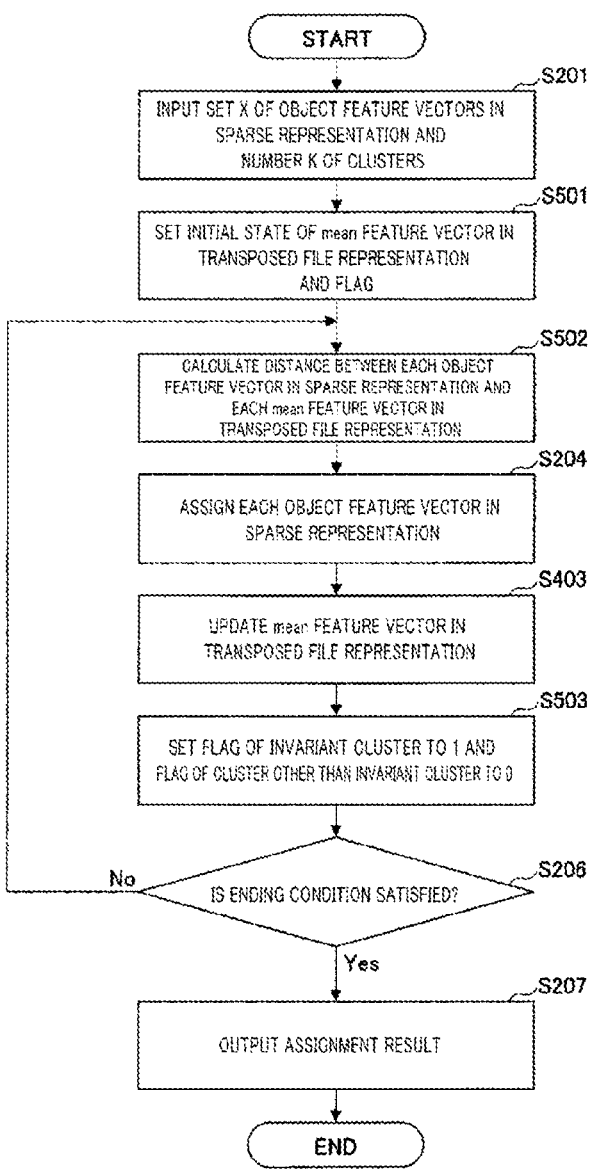
FIG. 15 is a flowchart (Example 4) illustrating an example of the clustering process in the embodiment of the present invention.

Next, a case in which the update of the mean feature vector $\mu_j$ is made efficient as Example 4 of the clustering process will be described with reference to FIG. 15. FIG. 15 is a flowchart (Example 4) illustrating an example of the clustering process in the embodiment of the present invention. Since step S201, step S204, steps S206 to S207, and step S403 in FIG. 15 are the same as those in Example 3, description thereof will be omitted.

Step S501: The initial setting unit 122 of the clustering processing unit 120 initializes the mean transposed file and the flag f indicating whether or not the cluster $C_j$ is an invariant cluster. The mean transposed file and the flag $f_j$, which have been initialized, are stored in, for example, the storage unit 130.

Here, the invariant cluster is a cluster $C_j$ in which there is no change in a member (the object feature vector $x_i$) belonging to the cluster in a previous iteration. In other words, when the member belonging to the cluster $C_j$ in the second previous iteration and the member belonging to the cluster $C_j$ in the previous iteration are the same, the cluster $C_j$ is an invariant cluster. Hereinafter, for example, when the flag $f_j=1$, the cluster $C_j$ is an invariant cluster, and when the flag $f=0$, the cluster $C_j$ is not an invariant cluster. An initial value of each flag $f_j$ may be set to 0, for example.

Step S502: The assignment unit 123 of the clustering processing unit 120 calculates the distance between each object feature vector $x_i$ in sparse representation and the mean feature vector $\mu_j$ in transposed file representation of the current iteration. Here, a definition of the distance is as in Formula (1) described above. Since the square of the norm can be calculated in advance as described above, the inner product calculation will be described below.

Incidentally, when the cluster $C_j$ to which a certain object feature vector $x_i$ belongs is an invariant cluster, the object feature vector $x_i$ does not newly belong to another invariant cluster $C_{j'}$ (j'≠j) in the current iteration. Therefore, when $C_j$ and $C_{j'}$ are invariant clusters and $(x_i \in C_j) \wedge (C_j \neq C_{j'})$, the calculation of the distance between the object feature vector $x_i$ and the mean feature vector $\mu_{j'}$ is unnecessary. This is also called invariant centroid-pair skipping filter (ICP).

Therefore, in Example 4, an inner product of the object feature vector $x_i$ in sparse representation and each mean feature vector $\mu_j$ in the transposed file representation is calculated in steps S502-1 to S502-6 below. As in Example 3, it is assumed that each tuple of the object feature vector $x_i$ in sparse representation is stored in the array $v_i[h]$, $0 \leq h \leq m-1$, and in transposed file representation including all mean feature vectors $\mu_j$, the feature quantity is stored in the two-dimensional array w[h] [r], $0 \leq h \leq D-1$ and $0 \leq r \leq q_h - 1$.

Step S502-1: The assignment unit 123 initializes each inner product value sum (j) to 0. Further, the assignment unit 123 performs initialization to h=1.

Step S502-2: The assignment unit 123 determines whether or not the cluster $C_j$ to which the object feature vector $x_i$ in sparse representation belongs is an invariant cluster. This may be determined by referring to the value of the flag f corresponding to the cluster $C_j$ to which the object feature vector $x_i$ belongs.

Step S502-3: When the assignment unit 123 determines that the cluster $C_j$ to which the object feature vector $x_i$ in sparse representation belongs is not the invariant cluster, the assignment unit 123 calculates an inner product of the object feature vector $x_i$ in sparse representation and each mean feature vector $\mu_j$ in the transposed file representation in steps S402-2 to S402-3, as in Example 3.

On the other hand, when the assignment unit 123 determines that the cluster $C_j$ to which the object feature vector $x_i$ in sparse representation belongs is an invariant cluster, the assignment unit 123 proceeds to step S502-4 below.

Step S502-4: The assignment unit 123 accesses each array element $[t_h-1]$ [r], $0 \leq r \leq q_{t_h}-1$ (to be exact, h of "th" is a subscript notation of t (that is, $t_h$). The same applies hereinafter.) using the feature ID "$t_h$" stored in the array element $v_i[h-1]$ of the array index h−1 of $x_i$, and determines whether or not the cluster corresponding to the meanID (cluster ID)

"$k_{thr}$" ($0 \leq r \leq q_{th}-1$) stored in each array element $w[t_h-1][r]$ is an invariant cluster. That is, the assignment unit 123 determines whether or not each of the clusters $C_j$ (where $j=k_{thr}$, $0 \leq r \leq q_{th}-1$) is an invariant cluster. This can be determined by referring to the value of the flag $f_j$ corresponding to the cluster $C_j$, as in the above.

Step S502-5: The assignment unit 123 calculates a product of the feature quantity stored in the array element w other than an array element in which a cluster ID "$j=k_{thr}$" of the cluster $C_j$ determined to be the invariant cluster in step S502-4 described above is stored among the respective array elements $w[t_h-1][r]$ and the feature quantity $v_h$ stored in the array element $v_i[h-1]$, and adds the product to sum (j). In other words, in Formula (7) described above, updating of sum (j) using the tuple regarding the invariant cluster $C_j$ is skipped.

Step S502-6: The assignment unit 123 determines whether or not "h>m" is satisfied. When the assignment unit 123 determines that "h>m" is not satisfied, the assignment unit 123 sets h←h+1 and returns to step S502-4. On the other hand, when the assignment unit 123 determines that "h>m" is satisfied, the assignment unit 123 ends the process.

The sum (j) finally obtained in steps S502-1 to S502-6 described above is an inner product value of the object feature vector $x_i$ in sparse representation and the mean feature vector $\mu_j$ in transposed file representation. Thus, in Example 3, when the object feature vector $x_i$ in sparse representation and the mean feature vector $\mu_j$ in transposed file representation belong to different invariant clusters $C_j$, the calculation of the inner product of $x_i$ and $\mu_j$ is omitted. Thereby, it is possible to reduce the number of inner product calculations and to further reduce the calculation amount.

Step S503: The updating unit 124 of the clustering processing unit 120 updates the flag $f_j$ according to the assignment result in step S204. That is, the updating unit 124 updates the flag $f_j$ to 1 when a member of the cluster $C_j$ is invariant from a previous iteration, and updates the flag $f_j$ to 0 when a member of the cluster $C_j$ is changed from the previous iteration in step S204.

As described above, the clustering device 10 in the embodiment of the present invention can cluster the object feature vector $x_i$ in sparse representation through the clustering process in Example 4. In this case, in Example 4, when the object feature vector $x_i$ in sparse representation and the mean feature vector $\mu_j$ in transposed file representation belong to different invariant clusters $C_j$, the calculation of the inner product of $x_i$ and $\mu_j$ is omitted. Thereby, it is possible to reduce the number of multiplications in the inner product calculation, and to perform more efficient clustering, as compared with Example 3.

Example 5

Figure 16:
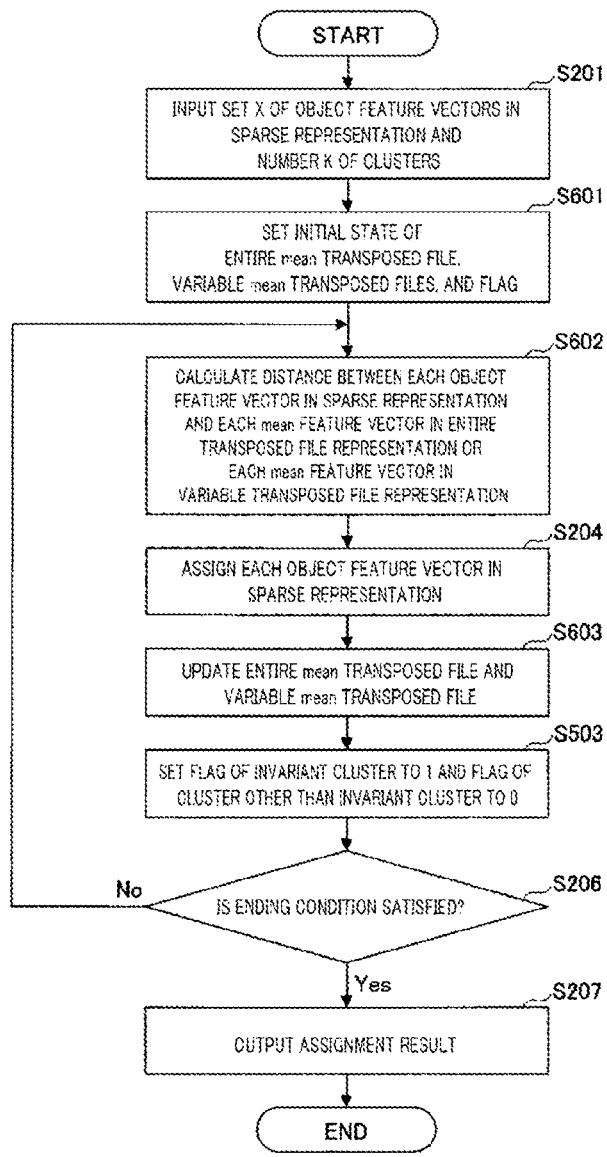
FIG. 16 is a flowchart (Example 5) illustrating an example of the clustering process in the embodiment of the present invention.

Next, a case in which two types of mean transposed files (that is, an "entire mean transposed file" and a "variable mean transposed file") are used as Example 5 of the clustering process will be described with reference to FIG. 16. FIG. 16 is a flowchart (Example 5) illustrating an example of the clustering process in the embodiment of the present invention. Since step S201, step S204, steps S206 to S207, and step S503 in FIG. 16 are the same as those in Example 4, description thereof will be omitted.

Step S601: The initial setting unit 122 of the clustering processing unit 120 initializes the entire mean transposed file, the variable mean transposed file, and a flag $f_j$ indicating whether or not the cluster $C_j$ is an invariant cluster. The entire mean transposed file, the variable mean transposed file, and the flag $f_j$, which have been initialized, are stored in, for example, the storage unit 130.

Here, entire mean transposed file are the mean transposed files in Examples 3 and 4. On the other hand, the variable mean transposed file is a file obtained by removing the mean feature vector $\mu_j$ belonging to the invariant cluster $C_j$ from the entire mean transposed file. The entire mean transposed file and the variable mean transposed file are initialized to the same content.

Step S602: The assignment unit 123 of the clustering processing unit 120 calculates the distance between each object feature vector $x_i$ in sparse representation and the mean feature vector $\mu_j$ in transposed file representation of the current iteration. Here, a definition of the distance is as in Formula (1) described above. Since the square of the norm can be calculated in advance as described above, the inner product calculation will be described below.

In Example 5, the inner product calculation is performed in steps S602-1 to S602-3 below.

Step S602-1: The assignment unit 123 initializes each inner product value sum (j) to 0. Further, the assignment unit 123 performs initialization to h=1.

Step S602-2: The assignment unit 123 determines whether or not the cluster $C_j$ to which the object feature vector $x_i$ in sparse representation belongs is an invariant cluster. This may be determined by referring to the value of the flag $f_j$ corresponding to the cluster $C_j$ to which the object feature vector $x_i$ belongs.

Step S602-3: When the assignment unit 123 determines that the cluster $C_j$ to which the object feature vector $x_i$ in sparse representation belongs is not the invariant cluster, the assignment unit 123 calculates an inner product of the object feature vector $x_i$ in sparse representation and each mean feature vector $\mu_j$ in the transposed file representation in steps S402-2 to S402-3 using the entire mean transposed file.

On the other hand, when the assignment unit 123 determines that the cluster $C_j$ to which the object feature vector $x_i$ in sparse representation belongs is the invariant cluster, the assignment unit 123 calculates the inner product of the object feature vector $x_i$ in sparse representation and each mean feature vector $\mu_j$ in the transposed file representation in steps S402-2 to S402-3 using the variable mean transposed file.

Thus, in Example 5, the inner product with the mean feature vector $\mu_j$ in transposed file representation is calculated using either the entire mean transposed file or the variable mean transposed file according to whether or not the cluster $C_j$ to which the object feature vector $x_i$ in sparse representation belongs is an invariant cluster.

Step S603: The updating unit 124 of the clustering processing unit 120 updates the entire mean transposed file and the variable mean transposed file with the object feature vector $x_i$ in sparse representation belonging to each cluster $C_j$. Here, when the mean feature vector $\mu_j$ belongs to the invariant cluster $C_j$, the updating unit 124 stores the mean feature vector $\mu_j$ only in the entire mean transposed file. On the other hand, when the mean feature vector $\mu_j$ does not belong to the invariant cluster $C_j$, the updating unit 124 stores the mean feature vector $\mu_j$ in both the entire mean transposed file and the variable mean transposed file. Thereby, the entire mean transposed file and the variable mean transposed file are updated.

As described above, the clustering device 10 in the embodiment of the present invention can cluster the object feature vector $x_i$ in sparse representation through the clustering process in Example 5. In this case, in Example 5, with the entire mean transposed file and the variable mean transposed file, the determination in step S502-4 of Example 4 (a determination as to whether or not the mean feature vector $\mu_j$ belongs to the invariant cluster $C_j$) is unnecessary, and the inner product calculation can be performed at high speed. However, in Example 5, since the entire mean transposed file and the variable mean transposed file are used, a larger memory capacity (a large storage capacity of the storage unit 130) is necessary as compared with Examples 3 and 4.

When the variable mean transposed file is used from the start of iteration of the Lloyd method, the memory capacity that is twice the entire mean transposed file is necessary in the worst case. Therefore, both Example 4 and Example 5 can be used. For example, the clustering process in Example 4 is executed until a predetermined certain condition is satisfied, and the clustering process in Example 5 is executed after the condition is satisfied. Examples of the predetermined certain condition are that the number of iterations is equal to or larger than a predetermined number, that a proportion of invariant clusters is equal to or higher than a predetermined proportion, and that the number of invariant clusters is equal to or larger than a predetermined number.

Example 6

Figure 17:
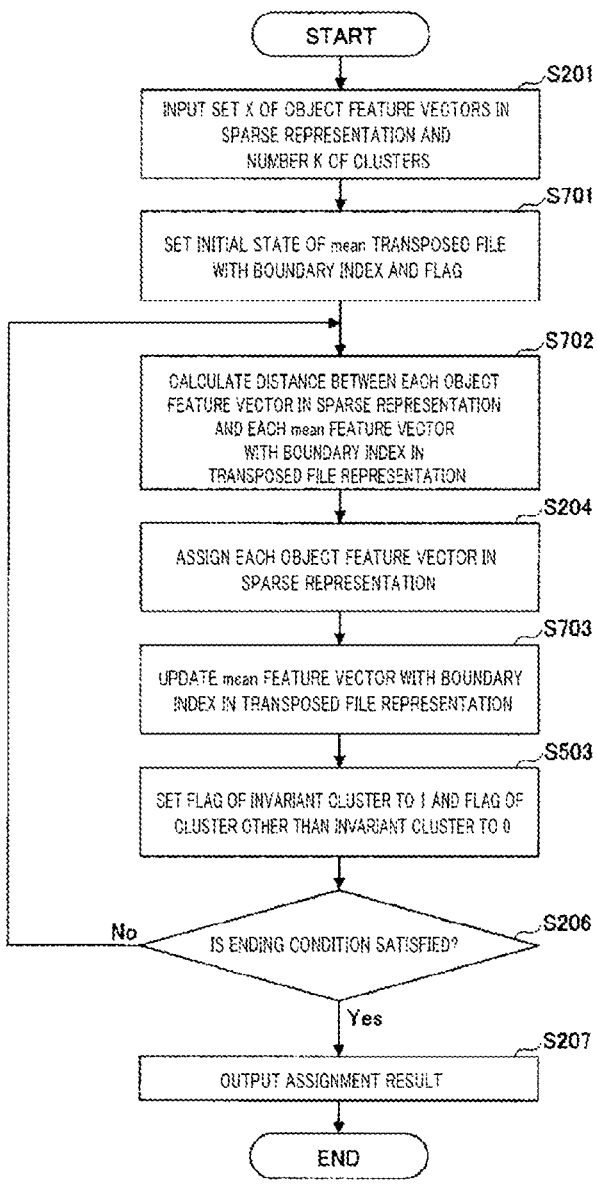
FIG. 17 is a flowchart (Example 6) illustrating an example of the clustering process in the embodiment of the present invention.

Next, a case in which a mean transposed file with a boundary index is used as Example 6 of the clustering process will be described with reference to FIG. 17. FIG. 17 is a flowchart (Example 6) illustrating an example of the clustering process in the embodiment of the present invention. Since step S201, step S204, steps S206 to S207, and step S503 in FIG. 17 are the same as those in Example 4, description thereof will be omitted.

Step S701: The initial setting unit 122 of the clustering processing unit 120 initializes the mean transposed file with a boundary index and the flag $f_j$ indicating whether or not the cluster $C_j$ is an invariant cluster. The mean transposed file with a boundary index and the flag which have been initialized, are stored in, for example, the storage unit 130.

Here, the mean transposed file with a boundary index is a transposed file in which the mean feature vector $\mu_j$ not belonging to the invariant cluster $C_j$ is stored in a first half part, and the mean feature vector $\mu_j$ belonging to the invariant cluster $C_j$ is stored in a second half part, and to which a boundary index indicating a boundary between the first half part and the second half part is imparted. The boundary index may be, for example, the index j of the mean feature vector $\mu_j$ stored at an end of the first half. Although not an essential requirement, each tuple may be sorted in ascending order of the meanID "j" (cluster ID) in each tuple sequence of the mean transposed file.

Here, an initial value of the boundary index may be, for example, a maximum value of the mean feature vector $\mu_j$ stored in the mean transposed file with a boundary index (that is, the index j of the mean feature vector $\mu_j$ stored last).

Step S702: The assignment unit 123 of the clustering processing unit 120 calculates the distance between each object feature vector $x_i$ in sparse representation and the mean feature vector $\mu_j$ in transposed file representation of the current iteration. Here, a definition of the distance is as in Formula (1) described above. Since the square of the norm can be calculated in advance as described above, the inner product calculation will be described below.

In Example 6, inner product calculation is performed in S702-1 to S702-3 below.

Step S702-1: The assignment unit 123 initializes each inner product value sum (j) to 0. Further, the assignment unit 123 performs initialization to h=1.

Step S702-2: The assignment unit 123 determines whether or not the cluster $C_j$ to which the object feature vector $x_i$ in sparse representation belongs is an invariant cluster. This may be determined by referring to the value of the flag $f_j$ corresponding to the cluster $C_j$ to which the object feature vector $x_i$ belongs.

Step S702-3: When the assignment unit 123 determines that the cluster $C_j$ to which the object feature vector $x_i$ in sparse representation belongs is not the invariant cluster, the assignment unit 123 calculates an inner product of the object feature vector $x_i$ in sparse representation and each mean feature vector $\mu_j$ in the transposed file representation in steps S402-2 to S402-3 using all mean feature vectors $\mu_j$ stored in the mean transposed file with a boundary index.

On the other hand, when the assignment unit 123 determines that the cluster $C_j$ to which the object feature vector $x_i$ in sparse representation belongs is an invariant cluster, the assignment unit 123 calculates the inner product of the object feature vector $x_i$ in sparse representation and each mean feature vector $\mu_j$ in transposed file representation in steps S402-2 to S402-3 described above using the mean feature vector $\mu_j$ from the beginning to the boundary index among the mean feature vectors $\mu_j$ stored in the mean transposed file with a boundary index.

Thus, in Example 6, when the cluster $C_j$ to which the object feature vector $x_i$ in sparse representation belongs is an invariant cluster, an inner product with the mean feature vector $\mu_j$ stored in the first half part of the mean transposed file with a boundary index is calculated. Thereby, the determination in step S502-4 of Example 4 (the determination as to whether or not the mean feature vector $\mu_j$ belongs to the invariant cluster $C_j$) is unnecessary, and it is possible to curb a memory capacity required for the mean transposed file with a boundary index.

Step S703: The updating unit 124 of the clustering processing unit 120 updates the mean transposed file with a boundary index with the object feature vector $x_i$ in sparse representation belonging to each cluster $C_j$. Here, the updating unit 124 stores the mean feature vector $\mu_j$ in the first half part of the mean transposed file with a boundary index when the mean feature vector $\mu_j$ does not belong to the invariant cluster $C_j$, and stores the mean feature vector $\mu_j$ in the second half part of the mean transposed file with a boundary index when the mean feature vector $\mu_j$ belongs to the invariant cluster $C_j$. Further, the updating unit 124 sets, for example, the index j of the mean feature vector $\mu_j$ stored in an end of the first half portion as a boundary index.

As described above, the clustering device 10 in the embodiment of the present invention can cluster the object feature vector $x_i$ in sparse representation through the clustering process in Example 6. In this case, in Example 6, with the mean transposed file with a boundary index, the determination in step S502-4 of Example 4 (a determination as to whether or not the mean feature vector $\mu_j$ belongs to the invariant cluster $C_j$) is unnecessary, and the inner product calculation can be performed at high speed. Besides, in Example 6, it is possible to efficiently perform clustering with a smaller memory capacity (a smaller storage capacity of the storage unit 130), as compared with Example 5.

The present invention is not limited to the specifically disclosed embodiment, and various modifications or changes can be made without departing from the claims.

REFERENCE SIGNS LIST

10 Clustering device
110 Preprocessing unit

120 Clustering processing unit
121 Input unit
122 Initial setting unit
123 Assignment unit
124 Updating unit
125 End determination unit
126 Output unit
130 Storage unit

The invention claimed is:

1. A computer-implemented method for clustering sparse data representing objects based on features of the objects, the method comprising:
   storing a transposed file, the transposed file including array elements, each of the array elements storing an element pair, the element pair including:
      a cluster identifier that identifies a cluster, and
      a first non-zero feature quantity of a mean feature vector representing a mean of object feature vectors associated with the cluster, the object feature vectors representing features of objects, and the element pair excluding a zero-value feature quantity of the mean feature vector;
   determining a distance between the object feature vector in sparse representation and the mean feature vector of the cluster, the object feature vector in sparse representation including a data structure of the object feature vector in a feature pair, the feature pair including:
      a second non-zero feature quantity of the object feature vector, and
      a feature identifier of the second non-zero feature quantity, and
      the feature pair excluding a zero-value feature quantity of the object feature vector;
   assigning, based on the determined distance, the object feature vector to one of a plurality of clusters.

2. The computer-implemented method of claim 1, wherein the determined distance is associated with an inner product based on a product of:
   the second non-zero feature quantity in the object feature vector in sparse representation, and
   the first non-zero feature quantity in the array element of an index based on the feature identifier, the feature identifier associated with the second non-zero feature quantity among array elements in the transposed file.

3. The computer-implemented method of claim 2,
   wherein a first array element is present before a second array element, wherein the first array element stores a pair including a first non-zero element of a mean feature vector corresponding to a changed cluster indicating a cluster in which an object feature vector belonging to the cluster has changed before and after the assignment,
   wherein the second array element stores a pair including a first non-zero element of a mean feature vector corresponding to an invariant cluster indicating a cluster in which an object feature vector belonging to the cluster has not changed before and after the assignment; and
   wherein the determined distance is associated with an inner product based on a product of:
      the second non-zero feature quantity included in the object feature vector in sparse representation and
      a first non-zero feature quantity either stored in an array element of an index based on a feature identifier corresponding to the second non-zero feature quantity or stored in the first array element in the array element among array elements in the transposed file, depending on whether the cluster to which the object feature vector in sparse representation belongs is an invariant cluster.

4. The computer-implemented method of claim 1, the method further comprising:
   storing a variable transposed file obtained by removing the feature pair including a first non-zero element of a mean feature vector corresponding to an invariant cluster indicating a cluster in which an object feature vector belonging to the cluster has not changed before and after the assignment from the transposed file; and
   determining, for generating an inner product associated with the determined distance, a product of:
      the second non-zero feature quantity in the object feature vector in sparse representation, and
      a first non-zero feature quantity stored in an array element of an index based on a feature identifier corresponding to the second non-zero feature quantity among array elements in the transposed file or the variable transposed file according to whether the cluster to which the object feature vector in sparse representation belongs is an invariant cluster.

5. The computer-implemented method of claim 1, wherein the determined distance is associated with an inner product based on a product of:
   the second non-zero feature quantity included in the object feature vector in sparse representation, and
   a first non-zero feature quantity associated with a cluster identifier of a changed cluster indicating a cluster in which an object feature vector belonging to the cluster has changed before and after the assignment.

6. The computer-implemented method of claim 1, the method further comprising:
   receiving a plurality of object feature vectors in sparse representation;
   receiving a number of clusters;
   initializing a mean feature vector in a complete representation, the complete representation including a zero-value element of the mean feature vector; and
   generating, based on the number of clusters, the plurality of clusters.

7. The computer-implemented method of claim 1,
   wherein an inner product for determining the distance is based on a mean transposed file with a boundary index, and
   where the mean transposed file with the boundary index includes:
      a first part including the mean feature vectors not belonging to an invariant cluster,
      a second part including the mean feature vectors belonging to the invariant cluster, and
      the boundary index associated with an index for the last mean feature vector in the first part.

8. A system for clustering sparse data representing objects based on features of the objects, the system comprises:
   a processor; and
   a memory storing computer-executable instructions that when executed by the processor cause the system to:
      store a transposed file, the transposed file including array elements, each of the array elements storing an element pair, the element pair including:
         a cluster identifier that identifies a cluster, and
         a first non-zero feature quantity of a mean feature vector representing a mean of object feature vectors associated with the cluster, the object feature vectors representing features of objects and the element pair excluding a zero-value feature quantity of the mean feature vector;

determine a distance between the object feature vector in sparse representation and the mean feature vector of the cluster, the object feature vector in sparse representation including a data structure of the object feature vector in a feature pair, the feature pair including:

a second non-zero feature quantity of the object feature vector, and a feature identifier of the second non-zero feature quantity, and the feature pair excluding a zero-value feature quantity of the object feature vector;

assign, based on the determined distance, the object feature vector to one of the plurality of clusters.

9. The system of claim 8, wherein the determined distance is associated with an inner product based on a product of:

the second non-zero feature quantity in the object feature vector in sparse representation, and the first non-zero feature quantity in the array element of an index based on the feature identifier, the feature identifier associated with the second non-zero feature quantity among array elements in the transposed file.

10. The system of claim 8, wherein a first array element is present before a second array element, wherein the first array element stores a pair including a first non-zero element of a mean feature vector corresponding to a changed cluster indicating a cluster in which an object feature vector belonging to the cluster has changed before and after the assignment, wherein the second array element stores a pair including a first non-zero element of a mean feature vector corresponding to an invariant cluster indicating a cluster in which an object feature vector belonging to the cluster has not changed before and after the assignment; and wherein the determined distance is associated with an inner product based on a product of:

the second non-zero feature quantity included in the object feature vector in sparse representation and a first non-zero feature quantity either stored in an array element of an index based on a feature identifier corresponding to the second non-zero feature quantity or stored in the first array element in the array element among array elements in the transposed file, depending on whether the cluster to which the object feature vector in sparse representation belongs is an invariant cluster.

11. The system of claim 8, the computer-executable instructions when executed further causing the system to:

store a variable transposed file obtained by removing the feature pair including a first non-zero element of a mean feature vector corresponding to an invariant cluster indicating a cluster in which an object feature vector belonging to the cluster has not changed before and after the assignment from the transposed file; and determine, for generating an inner product associated with the determined distance, a product of:

the second non-zero feature quantity in the object feature vector in sparse representation, and a first non-zero feature quantity stored in an array element of an index based on a feature identifier corresponding to the second non-zero feature quantity among array elements in the transposed file or the variable transposed file according to whether the cluster to which the object feature vector in sparse representation belongs is an invariant cluster.

12. The system of claim 8, wherein the determined distance is associated with an inner product based on a product of:

the second non-zero feature quantity included in the object feature vector in sparse representation, and a first non-zero feature quantity associated with a cluster identifier of a changed cluster indicating a cluster in which an object feature vector belonging to the cluster has changed before and after the assignment.

13. The system of claim 8, the computer-executable instructions when executed further causing the system to:

receive a plurality of object feature vectors in sparse representation;

receive a number of clusters;

initialize a mean feature vector in a complete representation, the complete representation including a zero-value element of the mean feature vector; and generating, based on the number of clusters, a plurality of clusters.

14. The system of claim 8, wherein an inner product for determining the distance is based on a mean transposed file with a boundary index, and where the mean transposed file with the boundary index includes:

a first part including the mean feature vectors not belonging to an invariant cluster, a second part including the mean feature vectors belonging to the invariant cluster, and the boundary index associated with an index for the last mean feature vector in the first part.

15. A computer-readable non-transitory recording medium storing computer-executable instructions that when executed by a processor cause a computer system to:

store a transposed file, the transposed file including array elements, each of the array elements storing an element pair, the element pair including:

a cluster identifier that identifies a cluster for clustering sparse data representing objects based on features of the objects, and a first non-zero feature quantity of a mean feature vector representing a mean of object feature vectors associated with the cluster, the object feature vectors representing features of objects and the element pair excluding a zero-value feature quantity of the mean feature vector;

determine a distance between the object feature vector in sparse representation and the mean feature vector of the cluster, the object feature vector in sparse representation including a data structure of the object feature vector in a feature pair, the feature pair including:

a second non-zero feature quantity of the object feature vector, and a feature identifier of the second non-zero feature quantity, and the feature pair excluding a zero-value feature quantity of the object feature vector;

assign, based on the determined distance, the object feature vector to one of the plurality of clusters.

16. The computer-readable non-transitory recording medium of claim 15, wherein the determined distance is associated with an inner product based on a product of:

the second non-zero feature quantity in the object feature vector in sparse representation, and the first non-zero feature quantity in the array element of an index based on the feature identifier, the feature identifier associated with the second non-zero feature quantity among array elements in the transposed file.

17. The computer-readable non-transitory recording medium of claim 15,
wherein a first array element is present before a second array element, wherein the first array element stores a pair including a first non-zero element of a mean feature vector corresponding to a changed cluster indicating a cluster in which an object feature vector belonging to the cluster has changed before and after the assignment in the assignment means is present,
wherein the second array element stores a pair including a first non-zero element of a mean feature vector corresponding to an invariant cluster indicating a cluster in which an object feature vector belonging to the cluster has not changed before and after the assignment in the assignment means; and
wherein the determined distance is associated with an inner product based on a product of:
the second non-zero feature quantity included in the object feature vector in sparse representation and
a first non-zero feature quantity either stored in an array element of an index based on a feature identifier corresponding to the second non-zero feature quantity or stored in the first array element in the array element among array elements in the transposed file, depending on whether the cluster to which the object feature vector in sparse representation belongs is an invariant cluster.

18. The computer-readable non-transitory recording medium of claim 15, the computer-executable instructions when executed further causing the system to:
store a variable transposed file obtained by removing the feature pair including a first non-zero element of a mean feature vector corresponding to an invariant cluster indicating a cluster in which an object feature vector belonging to the cluster has not changed before and after the assignment from the transposed file; and
determine, for generating an inner product associated with the determined distance, a product of:
the second non-zero feature quantity in the object feature vector in sparse representation, and
a first non-zero feature quantity stored in an array element of an index based on a feature identifier corresponding to the second non-zero feature quantity among array elements in the transposed file or the variable transposed file according to whether the cluster to which the object feature vector in sparse representation belongs is an invariant cluster.

19. The computer-readable non-transitory recording medium of claim 15, wherein the determined distance is associated with an inner product based on a product of:
the second non-zero feature quantity included in the object feature vector in sparse representation, and
a first non-zero feature quantity associated with a cluster identifier of a changed cluster indicating a cluster in which an object feature vector belonging to the cluster has changed before and after the assignment.

20. The computer-readable non-transitory recording medium of claim 15, the computer-executable instructions when executed further causing the system to:
receive a plurality of object feature vectors in sparse representation;
receive a number clusters;
initialize a mean feature vector in a complete representation, the complete representation including a zero-value element of the mean feature vector; and
generating the plurality of clusters.

\* \* \* \* \*